United States Patent [19]

Weber et al.

[11] Patent Number: 4,769,207

[45] Date of Patent: Sep. 6, 1988

[54] DISASSEMBLEABLE AND REASSEMBLEABLE SEALING DEVICE FOR PIPELINES, ESPECIALLY FOR REACTOR COOLANT NOZZLES OF REACTOR PRESSURE VESSELS, AND METHOD FOR TESTING THE SEALING DEVICE

[75] Inventors: Robert Weber, Uttenreuth; Josef Harrer, Forchheim, both of Fed. Rep. of Germany

[73] Assignee: Kraftwerk Union Aktiengesellschaft, Mülheim/Ruhr, Fed. Rep. of Germany

[21] Appl. No.: 946,637

[22] Filed: Dec. 29, 1986

Related U.S. Application Data

[63] Continuation of Ser. No. 519,487, Aug. 1, 1983, abandoned.

[30] Foreign Application Priority Data

Aug. 2, 1982 [DE] Fed. Rep. of Germany ....... 3228802

[51] Int. Cl.$^4$ ............................................. G21C 13/06
[52] U.S. Cl. ...................................... 376/204; 138/89
[58] Field of Search ................ 138/89, 90, 91, 92; 376/203, 204, 245, 250

[56] References Cited

U.S. PATENT DOCUMENTS

| | | | |
|---|---|---|---|
| 2,870,794 | 1/1959 | Thaxton | 138/90 |
| 3,537,483 | 11/1970 | Teague, Jr. | 138/93 |
| 3,561,490 | 2/1971 | Little | 138/90 |
| 3,842,612 | 10/1974 | Arnold | 138/89 |
| 3,978,678 | 9/1976 | Duncan et al. | 138/89 |
| 4,144,909 | 3/1979 | Harrison | 138/89 |
| 4,312,708 | 1/1982 | Leslie | 376/203 |
| 4,316,487 | 2/1982 | Denoor et al. | 138/89 |
| 4,470,946 | 9/1984 | Vassalotti et al. | 376/204 |

FOREIGN PATENT DOCUMENTS 0014874 1/1980 European Pat. Off. .
1171899 11/1969 United Kingdom .

Primary Examiner—Deborah L. Kyle
Assistant Examiner—Richard L. Klein
Attorney, Agent, or Firm—Herbert L. Lerner; Laurence A. Greenberg

[57] ABSTRACT

A disassembleable and reassembleable sealing device for pipelines, includes a cylindrical sealing insert being insertable into a pipeline in a given direction, the sealing insert having a front cup part with a closed cross section and a rear ring part, as seen in the given insertion direction, the cup and ring parts being annular, coaxial and slideable into each other in axial direction of the sealing insert, the cup and ring parts having corresponding peripheral surfaces and ring shoulder surfaces at the outer periphery of the cup and ring parts defining at least one ring seat, at least one sealing ring inserted into the ring seat between the cup and ring parts, the sealing ring being bulged outward by deformation forces exerted on the sealing ring by the ring seat when the cup and ring parts slide toward each other, increasing the diameter of the sealing ring for pressing the sealing ring against the ring seat and forming a ring bead on the sealing ring resting against the inner periphery of the pipeline forming a seal, and an operating device being coupleable to and uncoupleable from the sealing insert for transporting, inserting and disassembling the sealing insert.

46 Claims, 11 Drawing Sheets

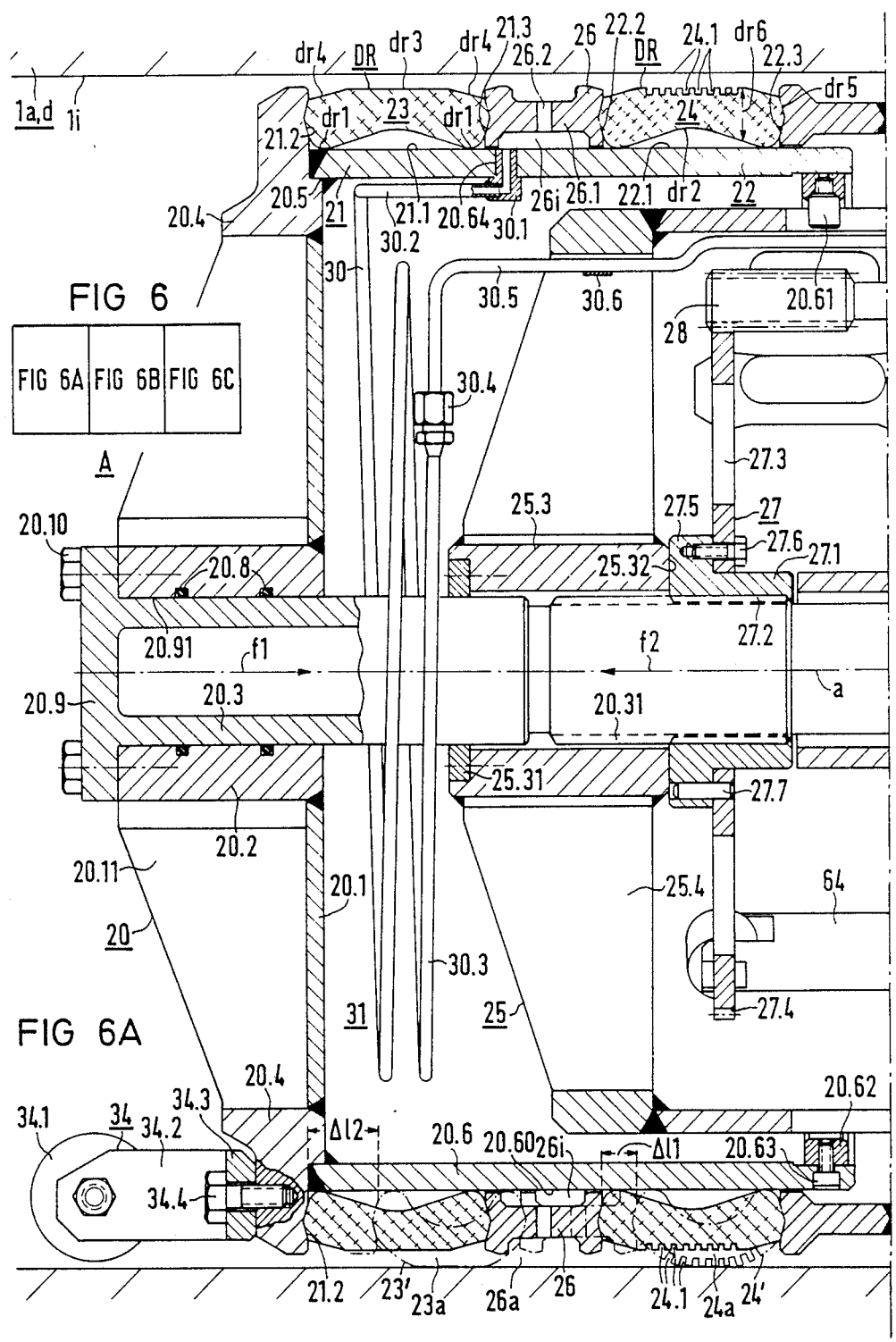

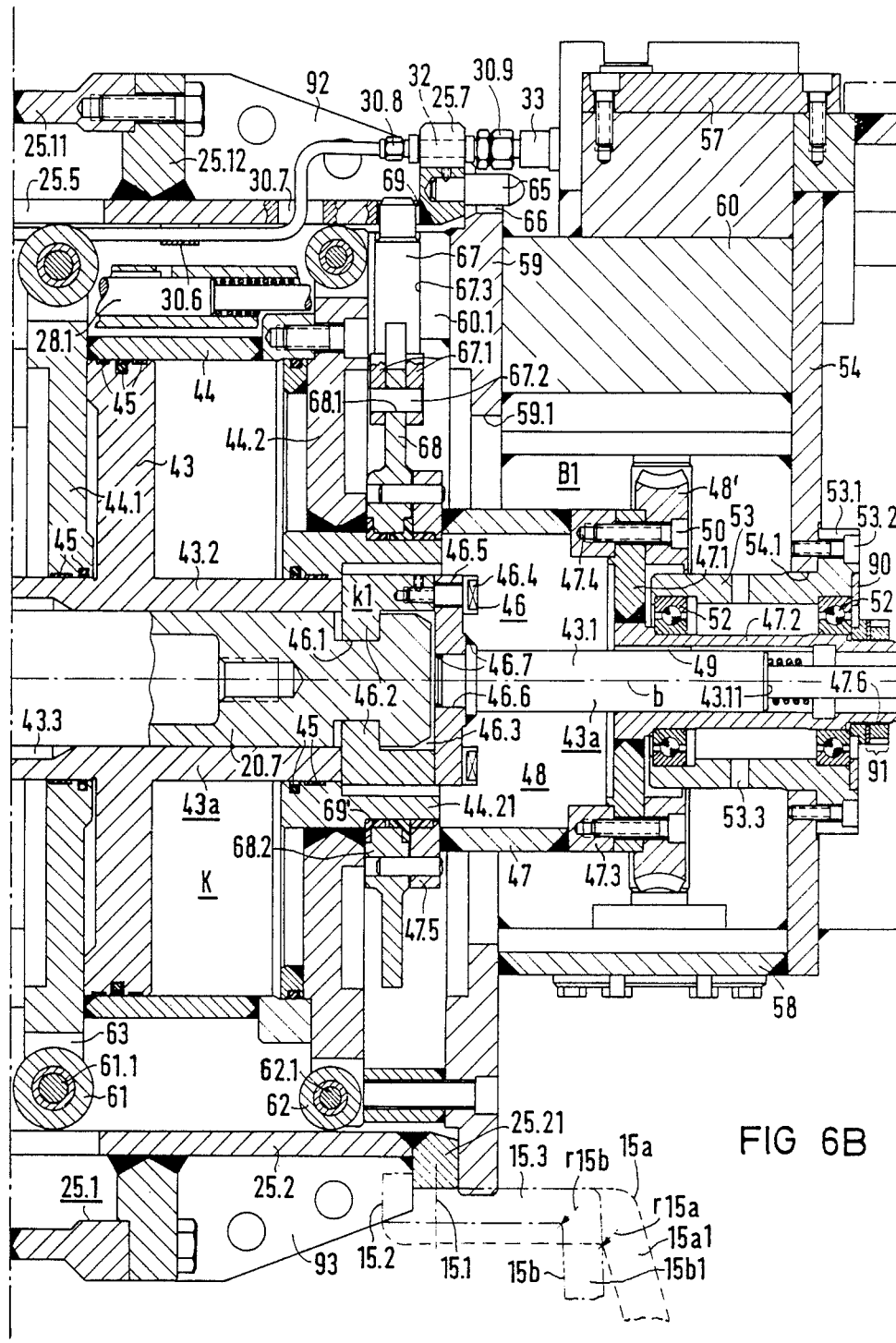

DISASSEMBLEABLE AND REASSEMBLEABLE SEALING DEVICE FOR PIPELINES, ESPECIALLY FOR REACTOR COOLANT NOZZLES OF REACTOR PRESSURE VESSELS, AND METHOD FOR TESTING THE SEALING DEVICE

This application is a continuation, of application Ser. No. 519,487, filed Aug. 1, 1983, now abandoned.

BACKGROUND OF THE INVENTION

1. Field of the Invention

The invention relates to a disassembleable and reassembleable sealing device for pipelines, especially for sealing the reactor coolant nozzles of a reactor pressure vessel when connected reactor loop components such as main coolant pumps or stem generators are drained for performing inspection or maintenance work thereon, with a cylindrical sealing insert which is fitted with at least one sealing ring at the outer periphery thereof, the sealing ring being disposed at the peripheral and circular shoulder surface of a ring seat being fitted to the inner periphery of the pipeline or nozzles to be sealed and being insertible into the pipeline or nozzles, wherein the diameter of the sealing ring can be increased in such a manner that it is pressed tight against the inner periphery of the pipelines or nozzles and against its ring seat surfaces.

2. Description of the Prior Art

Such a sealing device is known from European Pat. No. 0 014 878. The sealing insert disclosed therein is assembled at the site of the seal, i.e., within the piping or nozzle section to be sealed, from individual washer sections, and its convex side as well as its periphery are covered with a tight ribber skin which changes at the outer circumference of the sealing insert into an inflatable sealing ring. The sealing, insert is locked in its position by adjustable radially movable latches which engage corresponding recesses at the inner periphery of the nozzle. Furthermore, more than one washer-like sealing insert with a sealing skin and one or more inflatable sealing rings, may be provided in the device under discussion. This conventional sealing insert requires a relatively large expenditure for positioning, assembly and disassembly; this is because these operations can generally only be performed in situ by a service crew. The prior art sealing insert is not suitable, or is only suitable to a limited degree, for remotely controlled insertion and disassembly. Unless it is desired to drain the reactor pressure vessel, the disassembly and reassembly must be performed with diving equipment.

SUMMARY OF THE INVENTION

It is accordingly an object of the invention to provide a disassembleable and reassembleable sealing device for pipelines, especially for reactor coolant nozzles of reactor pressure vessels and a method of testing the sealing device, which overcomes the hereinafore-mentioned disadvantages of the heretofore-known devices and method of this general type, and which will work without inflatable sealing rings, i.e., in which there is no danger that the seal might become leaky because of a leak in the pressure medium loop of the sealing rings. It should furthermore be possible to conveniently transport the sealing device with its sealing insert under remote control to and from the site of the seal, to install and also disassemble it there. Specifically, in the case of a reactor pressure vessel, especially one for pressurized-water reactors, it should be possible to perform these operations from the interior of the reactor pressure vessel and through the reactor chamber above, while both spaces are filled with water for shielding reasons. A water column of about 13 to 15 m stands from the level of the reactor coolant nozzle, which is to be sealed with the sealing device according to the invention, up the upper edge of the reactor chamber, if an inspection is to be performed, i.e., with the reactor pressure vessel open. The reactor pressure vessel is opened about once a year for the purpose of a fuel change and for inspection. If the inspection work is also to be performed in the steam generators connected to the reactor pressure vessel through the reactor coolant lines, i.e., in their primary chambers, then the water column standing in the pressure vessel must be compartmentalized or separated from the primary chambers of the steam generators before the primary chambers are drained. In this case, a very reliable seal is important because the serviceman working in the primary chamber of the steam generator must not be endangered by a water break in. This seal, however, is not permanent because it must be disassembled after the inspection work is finished. Depending on the power rating of the pressurized-water reactor installation, the reactor cooling system is formed of two, three or four identical cooling loops with one steam generator each, one or two reactor coolant pumps each, the connecting piping, as well as a common pressurizer. The in-service tests relate, firstly, to the reactor pressure vessel (ultrasonic tests being primarily involved), and secondly, to the connected steam generators, where eddy current tests of the steam generator tubes are primarily involved. With the invention, the above-mentioned coolant loops on the side of the reactor pressure vessel are now to be realiably sealed in such a manner that the cooling loops can be drained for performing in-service tests and at the same time, respective tests can be carried out in the interior of the reactor pressure vessel under water. This is because after the sealing is completed, it is possible to completely drain the reactor coolant on the steam generator side, while flooding is possible on the side of the reactor pressure vessel up to the highest level.

With the foregoing and other objects in view there is provided, in accordance with the invention, a disassembleable and reassembleable sealing device for pipelines, especially for sealing the reactor coolant nozzles of a reactor pressure vessel when connected reactor loop components such as main coolant pumps or steam generators are drained for performing inspection or maintenance work thereon, comprising a cylindrical sealing insert being insertable into a pipeline or nozzle in a given direction, the sealing insert having sealing body parts in the form of a front cup part with a closed cross section and a rear ring part, as seen in the given insertion direction, the cup and ring parts being annular, coaxial and slideable into each other in axial direction of the sealing insert, the cup and ring parts having corresponding peripheral surfaces and ring shoulder surfaces at the outer periphery of the cup and ring parts defining at least one ring seat, at least one sealing ring inserted into the ring seat between the cup and ring parts, the sealing ring being bulged outward by deformation forces exerted on the sealing ring by the ring seat surfaces when the cup and ring parts slide toward eachj other, increasing the diameter of the sealing ring for pressing the sealing ring against the ring seat and forming a ring bead on the sealing ring resting against the inner periphery of the pipeline or nozzle forming a seal, and an operating device being coupleable to and uncoupleable from the sealing insert for transporting, inserting and disassembling the sealing insert.

A method for preparing the sealing of a pipeline with a sealing device according to the invention, is also an object of the invention. This relates to a test method for the sealing insert before it is inserted into the pipeline or the reactor coolant nozzle as a seal.

The advantages achievable with the invention are in particular that the sealing inserts for the reactor coolant nozzles of the reactor vessel can be "set" and also "pulled" again under remote control through the water column which is 12 to 15 m high; and that the sealing inserts are identically constructed plug structures, the sealing rings of which are capable of reliably performing a sealing operation under difficult conditions such as prevail, for instance, in the case of the reactor coolant nozzles of reactor pressure vessels, i.e., on uneven surfaces with a roughness of up to 1 mm which are only coated but not ground. Natural rubber which is especially resistant to the borated water and deionate used in the reactor cooling loop and in the steam generator, has been found to be particularly suited as a material for the sealing rings. The sealing rings are so-to-speak axially squeezed so far that they rest against the inner periphery of the nozzle with its curvature, at a pressure which ensures the desired tightness, and they are fixed in this curved sealing position by locking the position of the cup part and the ring part.

Other features which are considered as characteristic for the invention are set forth in the appended claims.

Although the invention is illustrated and described herein as embodied in a disassembleable and reassembleable sealing device for pipelines, especially for reactor coolant nozzles of reactor pressure vessels, and method for testing the sealing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWINGS

FIGS. 6, 6A, 6B and 6C together are a longitudinal sectional view of the sealing device with three of its units, namely, a sealing insert on the front side, a tightening tool part coupled thereto and transmission housing of the operating device in a sequence as seen by the legend in FIG. 6;

DESCRIPTION OF THE PREFERRED EMBODIMENT

Figure 1:
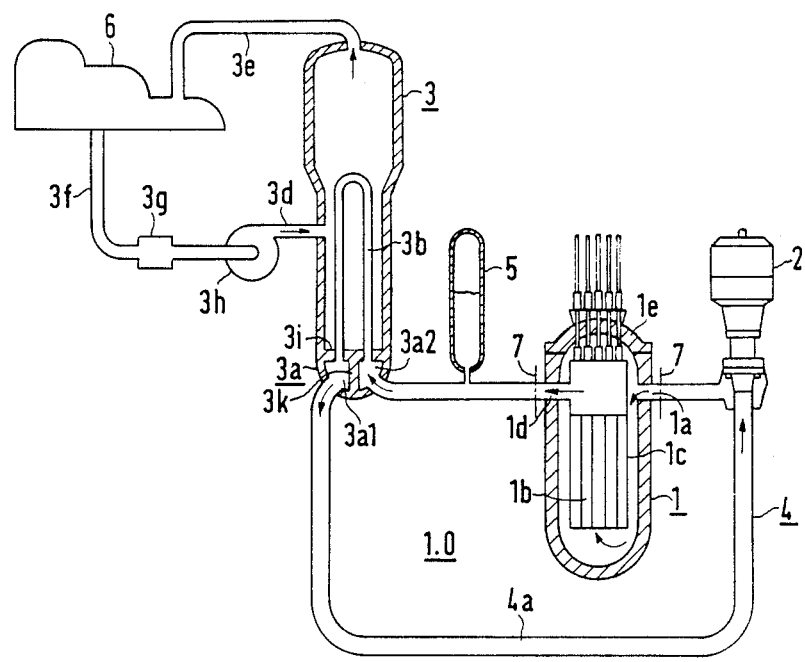
FIG. 1 is a diagrammatic, partly cross-sectional view of the primary loop of a pressurized-water reactor installation with a reactor pressure vessel, reactor cooling pump, pressurizer and steam generator as well as the connecting piping.

Referring now to the figures of the drawing in detail and first particularly to FIG. 1 thereof, there is seen a primary loop 1.0 of a pressurized-water nuclear power generating station. Specifically for the sake of simplicity, FIG. 1 shows only one coolant loop with a reactor pressure vessel 1, a reactor coolant pump 2, a steam generator 3, connecting reactor coolant lines 4 and a pressurizer 5 which is connected to a section of pipe between the steam generator 3 and the reactor pressure vessel 1. The pump 2 pumps a coolant (chemically processed water) through an inlet nozzle 1a of the pressure vessel 1, from where it flows downward around a core barrel 1c which contains fuel assemblies and control rods, i.e., a reactor core 1b, and leaves the presssure vessel through an outlet nozzle 1d after flowing through the core 1b from the bottom to the top. The flow direction of the reactor coolant is symbolized by flow arrows. The coolant then enters a primary chamber 3a of the steam generator 3 and flows through a U-tube bundle 3b thereof. The coolant leaves the primary chamber 3a through an outlet nozzle after flowing through the U-tube bundle. After leaving the outlet nozzle which is not specifically designated in FIG. 1, the coolant is pumped back from the steam generator through a return line 4a to the suction side of the pump 2. The secondary side of the steam generator 3 serves for generating superheated steam from feedwater which enters through a feedwater line 3d. The superheated steam leaves the steam generator through a main steam pipe 3e and is fed as the working medium to a steam turbo set 6. The steam, which is expanded in the stages of the steam turbine and is condensed in a non-illustrated steam condenser, is then fed through a feedwater line 3f, a feedwater tank 3g and a feedwater pump 3h back into the steam generator 3. The heat given off to the reactor coolant in the reactor core 1b is therefore given to the secondary medium through heating tubes of the U-tube bundle 3b. The pressurizer 5 fulfills the requirement for constant pressure of the primary medium.

The reactor pressure vessel 1 is opened at regular intervals for the purpose of changing fuel, i.e., a cover 1e of the vessel is unscrewed. During this shutdown phase, at which time the reactor pressure vessel 1 can also be tested from the inside with ultrasound, it is also desirable to simultaneously inspect the rest of the primary loop, as far as possible. This primarily involves an eddy current test of the steam generator tubes in the bundle 3b. The ends of the tubes are welded into a tube sheet 3i. To this end, an eddy current manipulator must be inserted into the primary chamber 3a of the steam generator 3, i.e., into two primary chamber halves 3a1 and 3a2 thereof, which are separated from each other by a partition 3k. The reactor pressure vessel 1 includes a water column which stands about 13 to 15 m above a nozzle plane normal to the vessel axis for shielding reasons. For the purpose of inserting the manipulator, the vessel is separated or compartmentalized from the remaining part of the collant loop, i.e., at locations which are indicated with dot-dash lines 7. After the separation or compartmentalization, the water can then be drained from the primary chamber 3a and from the other components 2, 5. The piping 4, 4a can be drained and subjected to an inspection from the inside, if required.

Figure 2:
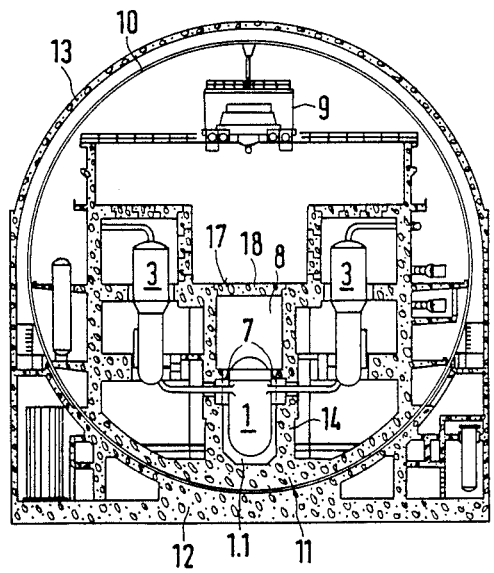
FIG. 2 is a vertical-sectional view of a spherical reactor building, showing the position and relationship of the reactor pressure vessel and two steam generators connected thereto.

FIG. 2 gives a true to scale picture of the location and relationship of the reactor pressure vessel 1 relative to the steam generators 3, a reactor chamber 8 and a building crane 9. The concrete structure of the reactor building disposed within a spherical steel vessel or containment 10, is designated with reference numeral 11, the steel-concrete foundation, on which the containment with the steel envelope 10 rests, is given reference numeral 12 and the outer steel-concrete safety shell which follows the steel-concrete foundation, is designated with reference numeral 13. The prestressed concrete structure of the biological shield which surrounds the reactor pressure vessel within a reactor pit, is element 14. In vicinity of the plane of the structure 14, normal to the axis of the reactor coolant nozzles, the reactor pressure vessel 1 is supported by means of support lugs on corresponding support levels of the biological shield radially movably centered under the influence of heat. The support lugs are not shown in detail.

Figure 3:
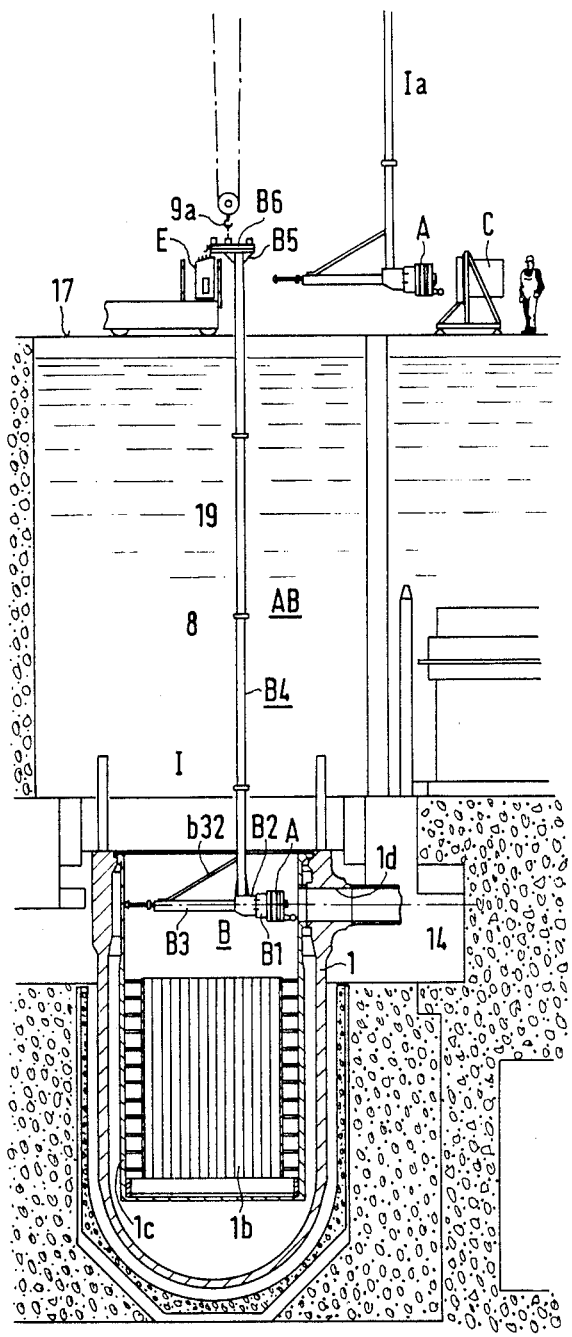
FIG. 3 is an enlarged, detailed, fragmentary cross-sectional view of the reactor building with the reactor pressure vessel open and a sealing device suspended from a building crane according to the invention in positions I and Ia, position I being shortly before the insertion of a sealing insert A into a corresponding coolant nozzle, and position Ia being shortly before the insertion or removal of the sealing insert A into or out of a test station C.
Figure 4:
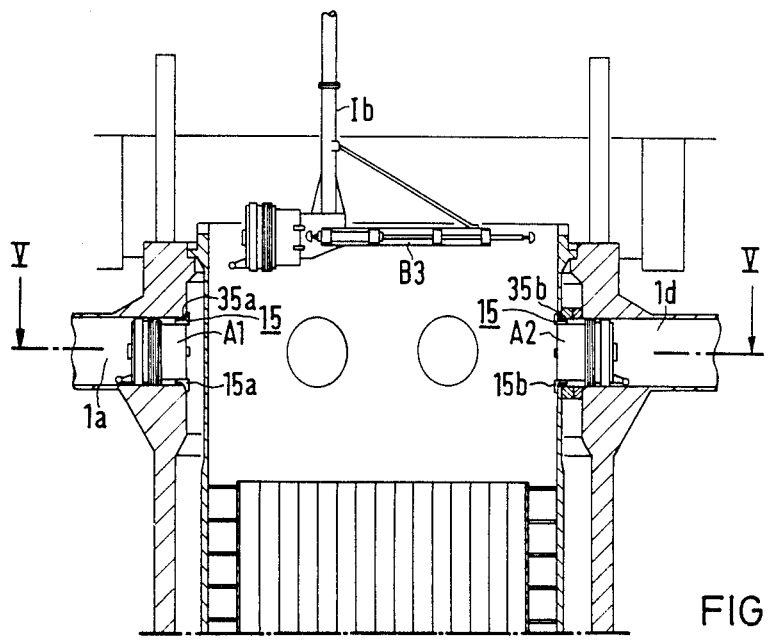
FIG. 4 is a further enlarged view of the upper part of the opened reactor pressure vessel according to FIG. 3, with the sealing device in an intermediate position 1b, in which the sealing insert to be inserted has not yet been lowered to the level of the nozzle and in which two sealing inserts A2 and A1 have already been inserted into two opposite nozzle openings. At the left side of the figure, a sealing insert A1 is shown inserted into the coolant nozzle with the core barrel removed, and at the right side of the figure, a sealing insert A2 is inserted into the pressure vessel nozzle from the inner periphery of the core barrel through the outlet opening thereof, and is therefore constructed somewhat differently with respect to the holding claws thereof. The section according to FIG. 4 therefore corresponds, for instance, to the section line IV—IV in FIG. 5, although it illustrates a different position of the sealing device with rotated sectional planes.
Figure 5:
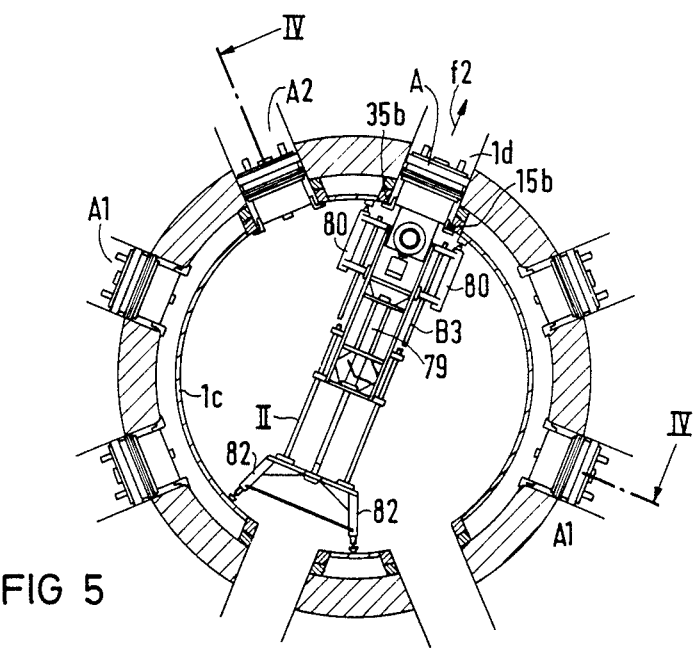
FIG. 5 is a cross-sectional taken along the line V—V in FIG. 4, in the direction of the arrows, along a plane normal to the axis of the reactor coolant nozzles, in a position II of the sealing device, in which the sealing device has a sealing insert A in the inserted position, and a positioning device B3 in the tightened position.

FIGS. 3 to 5 show a first overview of the disassembleable and reassembleable sealing device according to the invention. The sealing device is particularly well suited for sealing the reactor coolant nozzles 1a (inlet nozzle) and 1d (outlet nozzle) in reactor pressure vessels of pressurized-water nuclear power generating plants. However, the sealing device can also be applied wherever piping and nozzles must be sealed with a disassembleable and reassembleable sealing device.

In the embodiment shown, the sealing device designated with reference symbol AB as a whole, serves for sealing the reactor coolant nozzles 1a (inlet nozzles) and 1d (outlet nozzles) with corresponding sealing inserts A. In FIGS. 4 and 5, the inserts A are designated with reference symbol A1 when used for sealing inlet nozzles 1a, and with reference symbol A2 when used for sealing outlet nozzles 1d. In principle, these sealing inserts A1, A2 are of identical construction and only their holding claws 15a and 15b, are constructed differently from each other, fitting the contour of the nozzle edges; thus, the nozzle edge contour of the inlet nozzle 1a has a larger radius of curvature than the nozzle edge contour of the core barrel opening of the outlet nozzle 1d, which will be discussed in greater detail further on. As especially clearly seen in FIG. 3, the sealing device is formed in principle of the above-mentioned sealing insert A, in particular A1 and A2, and an operating device B for transporting, inserting and disassembling the sealing insert A. The operating device B can be coupled to and again decoupled from the sealing insert A. The operating device B is in turn formed of a tightening tool B1 which can be inserted into the interior of the sealing insert A coupled to the operating device; a transmission housing B2 which is structurally combined with the tightening tool part; a positioning device B3 which serves for hydraulically pushing the sealing insert A into the nozzle opening and for pulling the sealing insert from the opening; a support mast B4 composed of individual mast sections; an upper transmission housing B5; and, advantageously, a balancing carriage B6 which serves for balancing the sealing device AB at a crane hook 9a of the building crane 9 seen in FIG. 2. The balancing is accomplished in such a manner than the support mast B4 is always suspended in a vertically aligned position and the sealing insert is horizontally aligned. This balancing is important because the sealing device AB must always be in a balanced position whether the sealing insert A is still coupled-on or if it is already set and decoupled, and, for instance, it is desired to again couple the remaining part of the sealing device AB to the set sealing insert A.

Reference numeral 17 in FIG. 3 designates the level of an operating platform which is also indicated in FIG. 2; as compared to FIG. 2, however, ceiling locks 18 disposed above the reactor chamber 8 in FIG. 2 are removed in the presentation of FIG. 3, and the reactor chamber 8, as well as the pressure vessel 1, is filled with water 19 for shielding, up to a point shortly below the upper edge of the reactor chamber, at the level 17. However, for a better understanding of the view of FIGS. 3 to 5, reference will first be made to FIG. 6.

FIG. 6 shows two ring seats 21 and 22 which are disposed axially one behind the other at the outer periphery of a cup part 10. The ring seats have corresponding circumferential and ring shoulder surfaces 21.1, 21.2, 21.3 and 22.1, 22.2 and 22.3, respectively, at which sealing rings 23 and 24 are disposed. The sealing insert A is disposed with its sealing rings 23, 24 fitted to the inner diameter of the respective nozzles 1a and 1d to be sealed and the inserts can be inserted into nozzles as shown. The outer diameters of the sealing rings 23, 24 can be enlarged in such a way that they are pressed tightly against the inner periphery of the nozzle 1a or 1d, respectively, and against the inner periphery of their ring seats 21 and 22, respectively. The nozzle designation 1a, 1d illustrates that this may be an inlet or an outlet nozzle, as already mentioned; however, it may also be a section of pipeline which is accessible through an opening. The sealable insert A is mainly formed of two coaxial annular sealing body parts which can be moved axially relative to each other and can slide in each other. Specifically, the sealing insert A is formed of the already mentioned front end cup part 20 which is closed over its cross section, and a rear ring part 25. The cup part 20 and the ring part 25 are provided at their outside periphery with corresponding circumferential and ring shoulder surfaces for at least one ring seat, i.e., in the case shown, for the two ring seats 21 and 22. Accordingly, one sealing ring within a ring seat would be sufficient for sealing. However, for reasons of redundancy and increased sealing reliability, it is advisable to insert one sealing ring 23, 24 each (in principle, more than two sealing rings would also be possible) into the ring seat 21 and 22, respectively, between the cup part 20 and the ring part 25, as shown. In this manner, the sealing rings 23, 24 bulge outward due to the deformation forces exerted on the sealing rings 23, 24 through the surfaces of the ring seats 21, 22 when the cup part 20 and the ring part 25 approach each other and rest against the inner periphery 1i of the pipe with a circular bead, forming a seal. The bulging sealing position of the sealing rings 23, 24 is shown in phantom in the lower part of FIG. 6 and is designated with reference numerals 23' and 24', respectively. The sealing beads of the sealing rings are designated with reference symbols 23a and 24a. In the tightened condition of the cup part 20, a spacer ring 26 which is disposed between the two sealing rings 23, 24 and is axially movable with the sealing rings, has travelled a distance $\Delta 11$, and the bottom 20.1 of the cup part 20 with the ring shoulder 21.2 has travelled the axial distance $\Delta 12$ (which is approximately equal to $2 \times \Delta 11$).

As is shown in FIG. 6, the individual sealing ring, generally designated with reference symbol DR, has an approximately runner or bone-shaped cross section with ends dr1 enlarged in club or lobe-fashion and an inner central constriction dr2. The central constriction is advantageously formed on one side at the inner periphery of the sealing ring DR and has approximately the shape of a flattened V. The effect of this construction is that if the sealing ring DR is axially pushed with the cup part 20 moving in the direction of the arrow F1 toward the ring part 25, deformation force components occur within the sealing ring DR which run axially and radially outwardly, but not radially inwardly. The sealing ring DR therefore bulges outward with increasing axial compression. For tight contact, it is particularly advantageous in this case if the outer periphery of the sealing ring DR has a symmetrical trapezoidal shape as seen in cross section, with a flat contact surface dr3 for the inner periphery 1i of the pipe and with lobe surfaces dr4 which extend at an incline inwardly to the ends dr1. If the individual sealing ring DR makes contact as shown in FIG. 6A, then the contact and pressure forces exerted by the inner wall of the pipe 1i are at equilibrium with the radially upwardly directed forces within the sealing rings DR, which results in a very reliable seal. A further advantageous structure of the sealing ring DR is that the sealing ring has an approximately convex V-shaped profile with its end faces dr5, the sealing ring being inserted between correspondingly concave V-shaped oppositely disposed ring shoulder surfaces 21.2, 21.3 and 22.2, 22.3, respectively, of the ring seats 21, 22. In this way, the individual sealing ring DR cannot slip in the radial direction within its ring seats 21, 22, even if axial deformation forces are exerted thereon. An advantageous construction for the just described embodiment, in which a nozzle opening having an inner diameter in the order of magnitude of 800 mm was sealed, calls for the sealing ring DR to have a profile thickness in vicinity of its central constriction dr2, of about one-fifth less than at the thickest point of its enlarged ends dr1, and for the axial dimension to be about two to five times as large as its largest radial profile dimension dr6.

The bottom 20.1 of the cup part 20 is connected, as a ribbed partition wall, to ribs 20.11 extending in star-fashion, and the bottom 20.1 is welded together with the ribs 20.11 to the outer periphery of a hub 20.2, the hub 20.2 serving for tightly receiving and fastening a turnbuckle 20.3. The ring shoulder surfaces 21.2 of the cup part 20 for the sealing ring 23, are formed by radially protruding portions 20.4 of the partition wall 20.1. A cylindrical shell 20.6 of the cup part 20 is mounted on a circular shoulder 20.5 of the bottom 20.1. The cylindrical shell 20.6 of the cup part is welded in vicinity of the circular shoulder 20.5 to the bottom 20.1. The peripheral surfaces 21.1 and 22.1 for the ring seats 21, 11 are disposed at the outer periphery of the shell 20.6. It is seen from the above description that a first sealing ring 23 and, axially spaced therefrom, a second sealing ring 24, are disposed on the outer periphery of the cup part 20. Between the two sealing rings, the above-mentioned spacer ring 26 is mounted on the outer periphery of the shell 20.6 of the cup part 20 with a sliding fit. Each of the two ends of the spacer ring 26 form a ring shoulder surface ring seat 21.3 and 22.2 for the two axially adjacent sealing rings 23, 24. The two outer ends of the two sealing rings 23, 24 rest against a ring shoulder 21.2 of the cup part 20 and a shoulder 22.3 of the ring part 25. The ring shoulder 22.3 is disposed at the free end of an axial leg 25.11 of an angle ring 25.1, seen in FIG. 6B. The angle ring 25.1 also has a radial leg 25.12 which is fastened to a cylindrical shell 25.2 of the ring part 25. In this way, the ring part 25 extends with its axial leg 25.11 over the cylindrical part 20.6 of the cup part 20 and forms an annular abutment surface for the two sealing rings 23, 24.

Figure 6C:
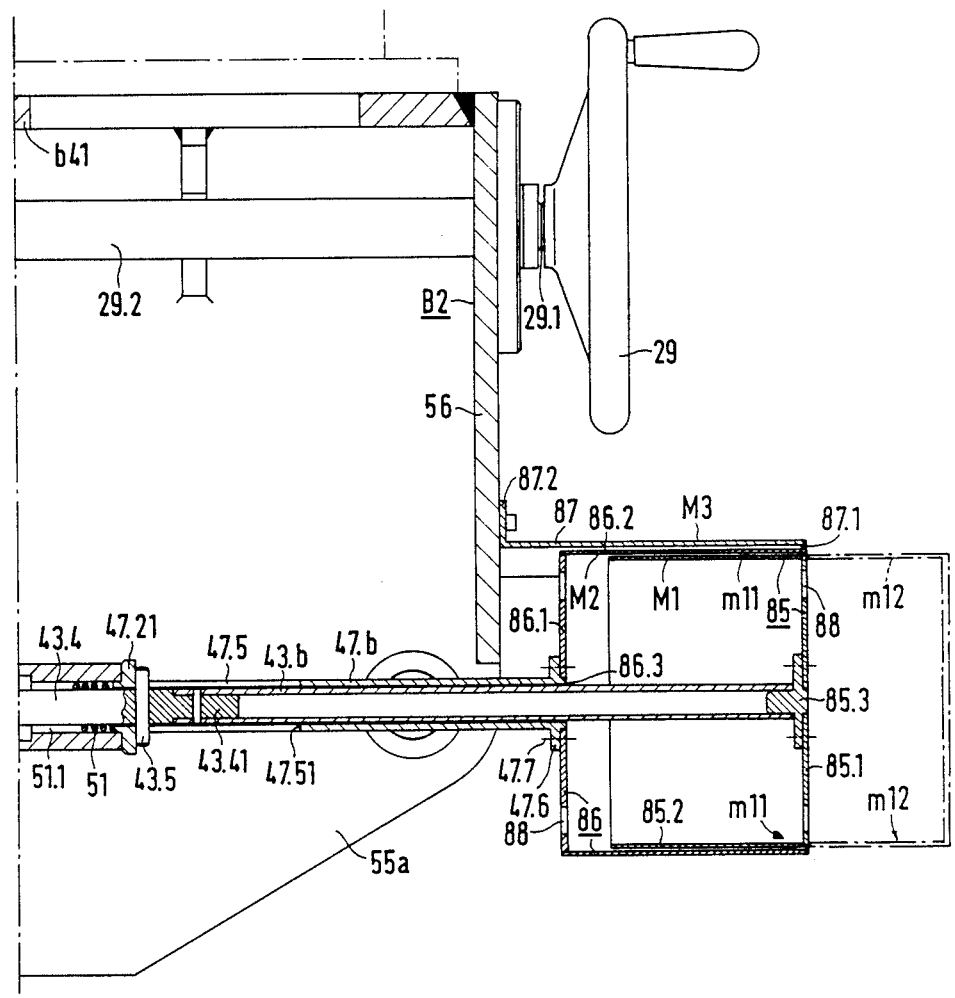

Accordingly, the ring part 25 is constructed as an abutment which can be fixed in both axial directions (tightening direction f1 and loosening direction f2) and the cup part 20 is constructed as a tightening element which can be moved relative to the ring part 25 in both axial directions by tightening forces. Means for locking the cup part in the tightened condition and for subsequently releasing the tightening forces and vice versa for disassembly by releasing the cup part 20 while briefly resupplying the tightening forces, will be explained later on in detail. For this purpose, the turnbuckle 20.3 of the cup part 20 is rigidly connected to and centered relative to the bottom 20.1 by the hub 20.2. The turnbuckle extends in an axially centered manner through the cup part 20 and the ring part 25 can be coupled at a coupling end 20.7 thereof to a tightening tool, which in the present embodiment, is a tightening tool part B1 of the operating device B, as seen in FIG. 6B. The turnbuckle 20.3 is mounted at its outer periphery and sealed by means of two O-rings 20.8, inside a cylindrical bore 20.91 formed in the hub 20.2, the O-rings 20.8 being disposed in corresponding circular slots formed in the hub 20.2. At its end face, the turnbuckle 20.3 has a ring flange 20.9, which firmly clamps the turnbuckle 20.3 against the end face of the hub 20.2 by means of screw bolts 20.10. The turnbuckle 20.3 may be bored hollow as shown in order to reduce its weight, as far as the specific strength values allow; the turnbuckle may be welded together from individual turnbuckle sections (as shown) or it may be made of one piece. The turnbuckle passes through a guide sleeve 25.3 of the ring part 25, which simultaneously forms a hub of the ring part 25 connected by spoke-like ribs 25.4 to the cylindical shell 25.2 of the ring part 25. In principle, the spoke-like ribs 25.4 of the ring part 25 as well as the ribs 20.11 of the cup part 20, may also be in the form of other cross-connecting means, such as partitions. The guide sleeve 25.3 is provided at its end face on the side thereof facing the cup part 20, with a guide insert 25.31 which has good sliding properties with respect to the alloy steel of the turnbuckle 20.3, and is therefore formed of a gliding metal, such as aluminum or bronze. This guide insert 25.31 is fastened in a corresponding recess at the end face of the guide sleeve 25.3 by means of a ring of fastening screws. An external thread 20.31, particularly a trapezoidal thread, is disposed on a central section of the turnbuckle 20.3, and a remotely controlled lock nut 27 is disposed on the external thread axially behind the guide sleeve 25.3 as seen in the tightening direction f1. The lock nut 27 has a corresponding internal thread 27.2 at the inner periphery of a hub part 27.1 thereof. This thread is preferably a trapezoidal thread as well corresponding to the external thread 20.31. The thread engagement is self-locking, i.e., axial tightening forces, no matter how large, cannot cause the lock nut 27 to rotate. Therefore, the selected trapezoidal thread is a square thread. The nut 27 shown is a counter nut with a nut disc 27.3 which has a spur gear 27.4 at its outer periphery. The above-mentioned hub 27.1 of the counter nut 27 has a flange 27.5 to which the nut disc 27.3 is bolted by means of screw bolts 27.6 and additionally pinned by means of pins 27.7. A pinion 28 which is indicated with broken lines and is mounted at the end of a pinion shaft 28.1, shown in FIG. 6B meshes with the counter nut 27. The shaft 28.1 extends parallel to the axis or rotation of the counter nut 27 from the tightening part B1 into the ring part 25, and can be turned by a hand wheel 29 shown in FIG. 6C, through an angle transmission, not specifically shown in FIG. 6. In the position shown, the counter nut 27 is disposed with the side of the hub part 27.1 facing the cup part 20, sitting on a corresponding counter end face 25.32 of the ring part guide sleeve 25.3. If the turnbuckle 20.3 is tightened in the direction of the arrow f1 (tightening direction) by means of the tightening tool part B1 and is held in this position, then the two sealing rings 23, 24 assume the position 23', 24' shown in the lower part of FIG. 6A and the counter nut 27 is disposed at an axial distance from the counter end face 25.32, corresponding to the tightening stroke or travel distance 12 of the cup part 20. The counter nut 27 can therefore be readjusted by rotation of the pinion shaft 28.1 with the pinion 28 by a transmission housing B2 of the operating device B shown in FIG. 6C, i.e., the counter nut can be rotated on the thread 20.31 so far that the end face of the nut facing the cup part 20 comes into contact with the counter end face 25.32. The tightening forces at the turnbuckle 20.3 can be stored because the turnbuckle with the cup part 20 is held in the tightened position of the sealing rings by the counter nut. Coversely, if the tight connection is to be released again, the turnbuckle 20.3 must be tightened again by means of the tightening tool part B1, because it is then easy to turn which loosens the end faces of the counter nut 27 from the counter end faces 25.32. To prevent the cup part 20 from rotating along, elongated holes 25.5 formed in the shell 25.2 as seen in FIG. 6B, are engaged by radially inwardly facing slide posts 20.61 fastened to the inner periphery of the cup part shell 20.6, as seen in FIG. 6A. The axial length of the elongated holes 25.5 corresponds to the stroke Δ12 of the cup part 20. The slide posts 20.61 are screwed into a ring 20.62 which is in turn fastened to the inner periphery of the shell 20.6 by means of screws 20.63 seen in FIG. 6A. The cup part 20 is therefore secured about a common longitudinal axis a relative to the ring part 25. The deformation forces which lead to contact of the sealing ring beads 23a, 24a with the inner periphery 1i of the pipe, are chosen to be larger for the first sealing ring 23 than for the second sealing ring 24. This is done, so that if the cup part 20 is moved in the tightening direction f1, first the second sealing ring 24 makes contact and only afterward the first sealing ring 23 makes contact. This deformation characteristic is achieved by the feature that the second sealing ring 24, which rests against the fixed ring shoulder 22.3 of the ring part 25, is provided with grooves 24.1 in its outer periphery, i.e. in its flat contact surface dr3, while the cross section of the first sealing ring 23 is not weakened. The second sealing ring 24 is therefore "softer"; for the same axial tightening forces, the second sealing ring 24 is deformed sooner than the first sealing ring 23. This is an advantage because in this way the first sealing ring 23 only comes into force-locking and frictional engagement with the inside wall 1i of the pipe in the last part of the axial stroke of the cup part 20 and thus "rubbing" of the first sealing ring 23 (which must execute practically twice the axial stroke as the second sealing ring 24) on the inside wall of the pipe is avoided without impairing the seal in the tightened sealing position. The grooves 24.1 extend in the circumferential direction so that the axial seal is preserved.

At least one hole 26.2 is formed in the spacer ring 26 at a circumferential web or cross piece 26.1 which connects the two ring shoulders 21.3 and 22.2. An inner annular space 26i and an outer annualr space 26a are formed at the inner and outer periphery of this spacer ring 26. The spaces are in communication with each other through the hole 26.2 and are acted upon by a pressure medium through a pressure line 30 and an opening 30.1 thereof formed in the shell 20.6 of the cup part 20, for tightness testing. The pressure line opening 30.1 is constructed as a nipple screwed into a hole 20.64 formed in the shell 20.6. A pressure line section 30.2 is in turn screwed into the nipple 30.1. The pressure line 30 is in particular, a hydraulic line for compensating the tightening travel or stroke Δ12 between the cup part 20 and the ring part 25. The line 30 is in the form of spirals 30.3 disposed in the transition region between the ring part 25, in which it is fixedly installed, and the cup part 20, i.e., in a space 31. The spirals 30.3 are disposed around the turnbuckle 20.3 up to the axially extending line section 30.2 and from there to the mouth 30.1. A screw coupler is furthermore disposed between the spiral part 30.3 of the pressure line 30 and a pressure line section 30.5 installed within the ring part 25. The line section 30.5 is installed at the inner periphery of the ring part shell 25.2 and is fixed at several points 30.6 by welded-on pipe sections or the like and is brought radially outwardly through a hole 30.7 formed in the right-hand end of the ring part. The line section 30.5 is then bent at an angle and connected to a screw nipple 30.8 which is screwed tightly in a ring flange 25.7 of the ring part 25, as seen in FIG. 6B. At the opposite end face of the ring flange 25.7, a corresponding connecting nipple 30.9 is screwed into a tapped hole 32 which also contains the screw nipple 30.8. In this way, hydraulic lines of the tightening tool part B1, which are not shown in detail, and hydraulic lines of the transmission housing B2 firmly connected thereto, can be tightly connected by corresponding coupling sections 33.

The hydraulic liquid used as the test medium can therefore be fed through the pressure line 30 to the space formed between the two sealing rings 23, 24, the inner periphery 1i of the pipe to be sealed and the outer periphery of the cup part 20, at a test pressure of several bar. In this way, it can be ascertained whether or not both sealing rings 23, 24 rest tightly in their sealing positions 24', 24'. A possible leak may be immediately read at a pressure gauge of an operating console E, seen in FIG. 3. The hydraulic medium is particularly well suited for use as the test medium because of its incompressibility.

Support roller arms 34 are provided especially for the remotely controlled insertion of the sealing insert A into the nozzle or pipeline designated with reference symbols 1a,d as a whole. The support roller arms 34 protrude in the insertion direction and serve as insertion guides in the circumferential region of the cup part 20, i.e., at the protruding portions 20.4 of the partition wall 20.1. More specifically, the support roller arms are advantageously symmetrical to the vertical plane, approximately in the lower third of the forward side of cup part 20. When the sealing insert is inserted by its operating device B shown in FIG. 3, the sealing insert can be pre-centered relative to the center of the nozzle opening 1a,d, and can roll with its support roller arms 34 (two per sealing insert are provided), along the lower part of the inner periphery 1i by means of rollers 34.1. The rollers 34.1 are rotatably supported at roller arms 34.2, and the roller arms are tightened by a suitable mounting flange 34.3 and by means of screw bolts 34.4 against the part 20.4 of the partition wall 20.1. As already mentioned, the nozzle edge contour 35a of the inlet nozzles 1a has a larger radius of curvature than the edge contour 35b of the core barrel openings. As is shown in FIG. 4, holding tabs or claws 15a of the sealing inserts reach behind the nozzle edges 35a and holding tabs or claws 15b of the sealing inserts A2 reach behind the nozzle edges 35b. These holding tabs or claws 15a, 15b are indicated in phantom in the lower part of FIG. 6B.

The claws are bolted to the cylinder flange 25.21 of the ring part shell 25.2 by suitable radial bolts 15.1, at four points evenly distributed over the circumference of the sealing insert. The claws extend behind the cylinder flange 15.21 with extensions 15.2 bent at right angles. To fit the nozzle edge contour 35a, the outer radius of curvature r15a of claw parts 15a1 of holding claws 15a is larger than the outer radius of curvature r15b of claw parts 15b1 of holding claws 15b. Of course, the claws 15b extend behind the nozzle edges 35b of the core barrel opening. A connecting strap 15.3 is disposed between the extensions 15.2 and the claw parts 15a1 and 15b1, respectively, and is parallel to the axis of the sealing insert A. Thus, an approximately S or Z-shaped cross section or a corresponding contour for the holding claws 15 is obtained. The claws hold the sealing insert A or A1, A2, respectively, on its set condition at the nozzle contour 35b of the respective opening 1a or 1d, against the static pressure of the shielding water column resulting from a water column of about 14 m.

Figure 7:
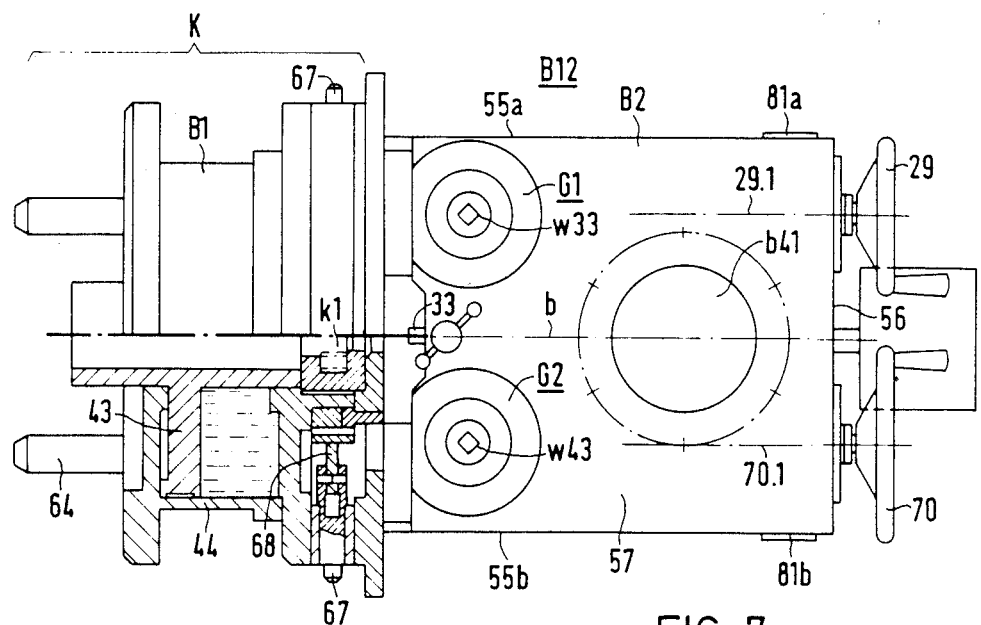
FIG. 7 is a partly cross-sectional, fragmentary elevational view of the clamping tool part and the transmission housing of the operating device connected thereto.
Figure 13:
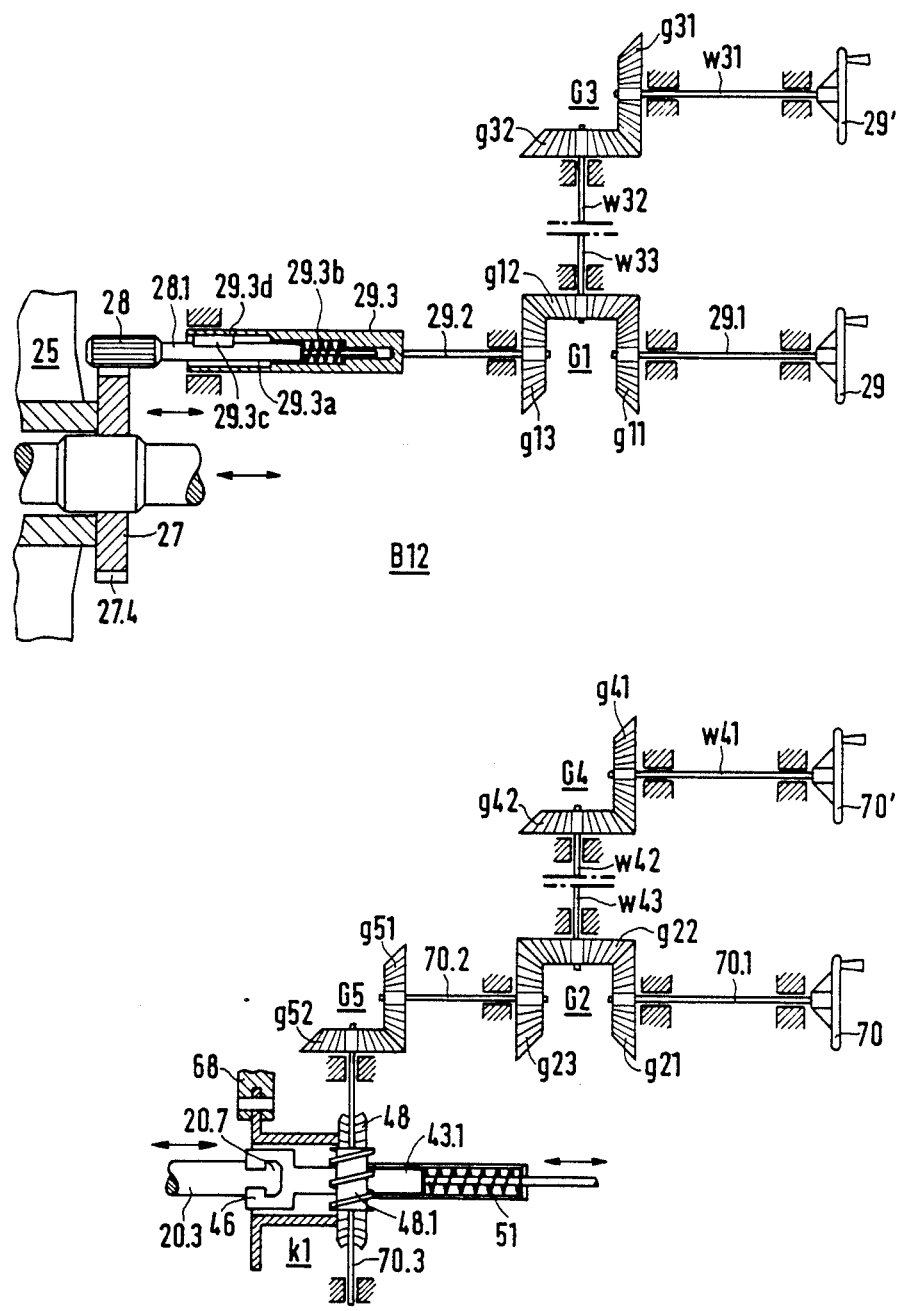
FIG. 13 is a fragmentary partially cross-sectional view of the functional connection between the upper and lower transmission housing and the pinion shaft as well as of the counter nut on one hand and the locking shaft with a coupling wheel, a tightening piston rod, a coupling jaw and a gate wheel, on the other hand.
Figure 14:
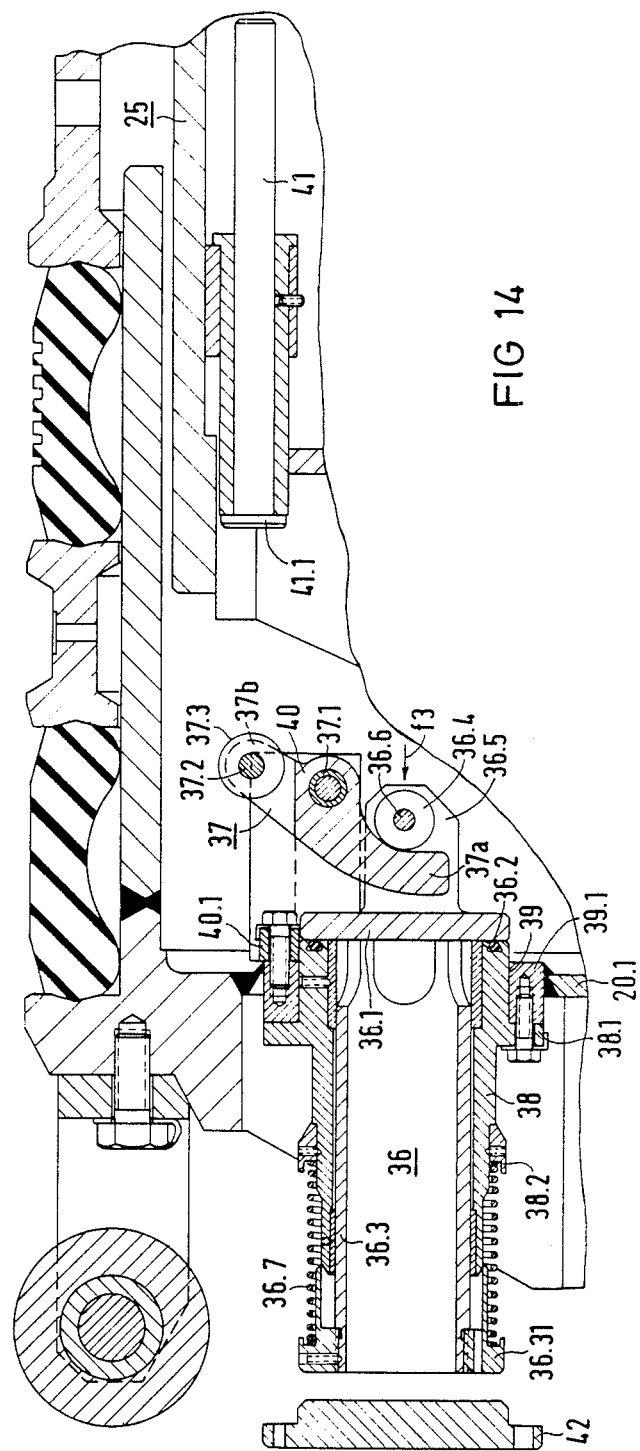
FIG. 14 is an enlarged, fragmentary, cross-sectional view of a flooding valve.

FIG. 14 is broken away to show that a remotely controlled valve 36 is located in the partition wall 20.1 of the cup part 20. The remotely controlled valve 36 has a closing piece 36.1 which is springloaded and is pushed in the direction f3 against a valve seat 36.2 by the water column 19 standing in the reactor pressure vessel, as seen in FIG. 3. This valve 36 serves as a flooding valve and can be opened briefly for the purpose of equalizing the pressure before the sealing insert A is disassembled, so that the pressure equalization can be established in the spaces in front of and behind the sealing insert, which are separated in the inserted condition. It is therefore possible to flood drained reactor loop spaces through this flooding valve 36, i.e., in particular, the nozzles and piplines 1a, 1d and the steam generator primary chamber 3a. If these elements are already flooded before the sealing insert A is removed, pressure equalization can be brought about which facilitates pulling the sealing insert A. For the remote control of the flooding valve 36, a rocking lever 37 supported in a fulcrum 37.1 of the cup part bottom 20.1, has a lever arm 37a which engages a valve plunger 36.3 connected to the closing piece 36.1. In particular, the lever arm 37a is curved like a finger and extends beyond a roll 36.4 which is supported on a shaft 36.6 fastened to a roller block 36.5. In this way, the rocking lever 37 can only exert forces on the closing piece 36.1 in the direction of the valve axis, i.e., opposite the arrows f3. The closing piece 36.1 is constructed as a valve disc and is mounted together with the roller block 36.5 at the tubular valve plunger 36.3 which in turn is longitudinally movably guided and spring-loaded in a guide sleeve 38 in the direction of the arrow f3. The guide sleeve 38 is tightly bolted to a ring flange 38.1 at a reinforced circular collar 39.1 on an insert opening 39 formed in the cup part bottom 20.1. Below the valve plunger 36.3, a reinforced base 40.1 of a pillow block 40 for the rocking lever 37 is provided for bolting the pillow block 40 to the circular collar 39.1. The rocking lever 37 has another lever arm 37b with a free end that is provided with a roller 37.3 mounted on a shaft 37.2. The lever arm 37b or the roller 37.3 of the rocking lever 37 can be engaged by an axially movable actuating rod 41 which is supported at the inner periphery of the ring part 25. If a tool-transmission part B12 of the operating device B, shown in FIGS. 7 and 13, is inserted into the sealing insert A, this actuating rod 41 can be moved axially under remote control by a piston rod in the tool-transmission part B12, which is preferably hydraulically operated. In this way, the non-illustrated piston rod displaces the actuating rod 41 so far that its head 41.1 meets with the roller 37.3 of the rocking lever 37. The closing piece 36.1 can therefore be opened for flooding and/or pressure equalization against the force of a valve return spring 36.7 which is provided as a compression coil spring. A screwed-on spring disc 36.31 which serves as a spring abutment, is mounted at the end of the valve plunger 36.3. The other end of the return spring 36.7 is braced against a ring shoulder 38.2 of the guide sleeve 38. If, in special cases, the admission of water and/or pressure equalization can be brought about by means other than by the flooding valve, the insert opening 39 can be closed by a separately shown cover 42, in the form of a blind flange.

As will be seen from FIGS. 6 and 7 as well as from the diagrammatic presentation of FIG. 13, the tool-transmission part B12 of the operating device B is formed of the tightening tool part B1 and the transmission housing B2, which has a tightening piston 43 with a tightening cylinder 44. In the inserted condition of the tool-transmission part B12 (as shown in FIG. 6), the tightening piston and cylinder are disposed with their longitudinal axis b coaxial with or aligned with the axis a of the sealing insert A. A piston rod 43a can be locked to the turnbuckle 20.3 and the tightening cylinder 44 can be locked to the ring part 25 of the sealing insert A. For this purpose, the tightening piston 43 is hollow, in the overlap region with the turnbuckle 20.3. A hollow piston part 43.2 passes through a bottom 44.1 as well as through a cover 44.2 of the tightening cylinder 44, in a sealed and axially movable as well as rotatable manner. Corresponding ring seals at the lead-through and slide points of the hollow piston part 43.2 and the piston 43 are generally designated with reference numeral 45. The hollow piston part 43.2 thus extends beyond the free end of the turnbuckle 20.3. An enlarged pocket 43.3 is provided to facilitate pushing-on over the free end of the turnbuckle. The right end of the hollow piston part 43.2 is provided with a cross-shaped clutch dog part 46 which is surrounded by a dog cup 47 with axial clearance or an empty space 48. This space 48 permits a spring-elastic axial displacement of the clutch dog part 46 in the coupling-on process. The piston rod 43 is formed of the hollow piston part 43.2 and a piston rod part 43.1.

A coupling wheel 48' constructed as a worm gear is connected to the bottom 47.1 of the dog cup 47. The dog cup 47 surrounds the piston rod part 43.1 with a tubular extension 47.1 of its bottom 47.1. The piston rod part 43.1 is supported in the tubular extension 47.2 in an axially movable and spring-loaded manner, but is secured against rotation by means of a key 49. Flange screws 50 pass through a worm gear or coupling wheel 48' on a pitch circle and likewise pass through the cup bottom 47.1 and clamp the parts 48', 47.1 against a flange ring 47.3 of the dog cup 47, in blind holes 47.4 in which the screws are anchored or screwedin. As mentioned, the piston rod 43a is axially movably supported and spring-loaded. This is accomplished by a bayonet spring 51, shown in FIGS. 6B and C. The spring 51 is constructed as a compression coil spring, and surrounds a reduced rod part 43.4 of the piston rod 43a. The spring 51 is located inside a hollow space 51.1, which the rod part 43.4 penetrates. The bayonet spring 51 is braced with one end thereof against a shoulder 43.11 of the piston rod 43a and with the other end thereof against a closing cover 47.21 of the hollow space 51.1. The closing cover 47.21 has a central opening which serves as a guide for the rod part 43.4 and the closing cover is inserted into the opening at the right end of the extension 47.2. At its outer periphery, the extension 47.2 is supported by means of two radial or supporting bearings 52 at the inner periphery of a hollow-cylindrical bearing housing 53; the housing 53 is inserted into a circular opening 54.1 in an end wall 54 of the transmission housing B2 and the housing 53 is clamped by a ring flange 53.1 against the end wall 54 by means of fastening screws 53.2.

The section according to FIG. 6 and the partial outside view according to FIG. 7 show that the transmission housing B2 which forms a structural unit with the tightening tool part B1, is substantially box-shaped. The transmission housing B2 is formed of a structure which is stiffened against twisting and includes, besides the already mentioned end wall 54, two side walls 55a, 55b, an outer wall 56, a cover wall 57, a bottom wall 58, a forward end wall 59 with a central cutout 59.1, as well as longitudinal posts 60 connecting the above-mentioned wall parts.

It is particularly clearly illustrated in FIG. 6B that the operating device B has a cylindrical insertion end K of its tightening tool part B1 or its tool-transmission part B12, which can be inserted coaxially into the ring part 25, i.e., into the shell 25.2 of the sealing insert A. In the process, the end K can be coupled with the piston rod 43a of the tightening piston 43 to the turnbuckle 20.3 of the sealing insert A by a disengageable coupler k1. The coupler k1 is preferably a bayonet coupling which, as is shown in the cross section according to FIG. 6B, may in principle be constructed as a hammer-head bayonet lock for the hammerhead-like coupling end 20.7 of the turnbuckle 20.3 and the corresponding coupler dog 46. The coupling includes an entrance slot 46.1 in the coupler dog 46, in which two dog parts 46.2 are engaged as shown, after the hammer head 20.7 is inserted through the slot 46.1 into the interior 46.3 of the coupling dog, and after the coupler dog 46 or the connected piston rod 43.1 behind the hammerhead 20.7 is turned with the dog parts 46.2. In the embodiment example shown, a cross-hammer head and a coupler dog 46 provided with a corresponding cross slot 46.1 is used, so that after the hammerhead 20.7 is inserted through the cross slot 46.1, the hammerhead 20.7 is locked in the coupler dog 46 by a relative rotation of these two parts through an angle of 45°. For simplification, such a coupling is called a cross-head bayonet lock. In addition to the cross-shaped dog parts 46.2 (of which only two are visible in FIG. 6), the coupler dog 46 has a dog bottom 46.5 which is fastened to the dog parts 46.2 by means of socket-head cap screws 46.5. The piston rod 43a with its part 43.1 is fastened to the bottom 46.5 by fitting it into an opening 46.6 and welding with welds 46.7.

An essential element of the cylindrical insertionend K of the tightening tool part B1 is the tightening cylinder 44. Rings of guide rollers 61, 62 are provided at the outer periphery of the cylinder 44, preferably at the outer periphery of the cylinder bottom 44.1, and at the cylinder cover 44.2. The rings of guide rollers 61, 62 are provided with axles 61.1, 62.1 which are tangentially oriented. The planes of the rollers are radially oriented. The guide rollers 61, 62 are supported at sides formed by slots 63. At least three guide rollers, uniformly distributed over the circumference of a guide roller plane normal to the axis, are to be provided; in the illustrated embodiment, there are four guide rollers, which can roll along axially at the inner periphery of the cylinder shell 25.2, so that the insertion end K is axially guided in the insertion direction f2 and in the withdrawal direction f1. As seen in FIGS. 6A and 7, support roller arms 64 are fastened to the cylinder bottom 44.1 on the front of the coupler end K. The support roller arms 64 serve as so-called inward guides and protrude axially in the insertion direction f2. Similarly to the support roller arms 34 of the cup part 20, the arms 64 provide an insertion aid if the tool-transmission part B12 is brought from above to the nozzle opening 1a, 1d with the sealing insert A in place, and is to be inserted for coupling to the sealing insert A. Preferably, two such roller arms are provided, symmetrically to the vertical in the lower third of the coupling end K or the fightening tool part B1. If the unit B12 of the operating device B is coupled to the sealing insert A, i.e., if the entire unit A-B12 is to be brought to the nozzle opening 1a, 1d for inserting the sealing insert A and is to be run into the former, then the support roller arms 34 take over the directing function. A further alignment function is provided by conical guide pins 64 at the flange 25.21 of the ring part shell 25 as seen in FIG. 6B. When the tool-transmission part B12 is inserted in the sealing insert, the guide pins 65 engage corresponding recesses 66 at the outer periphery of the forward end wall 59 of the transmission housing B2 and thus establish the correct angle-of-rotation relationship between the units A and B12, so that, for instance, the hydraulic couplers 30.9/33 also fit together. Locking bolts 67 are radially movably supported at the outer periphery of the insertion end K, and are distributed over the periphery. The locking bolts 67 can be brought into engagement with locking openings 69 formed in the cylinder shell 25.2 of the ring part 25. This is done by a gating disc 68 connected to and secured against rotation relative to, the tightening piston rod 43.1, 43.2 when the tightening piston rod is rotated in the bayonet locking direction. The locking bolts 67 can be taken out of engagement together with the bayonet coupling k1 when the tightening piston rod 43.1, 43.2 is rotated in the opposite direction. FIG. 6 illustrates the locked position, where the bayonet coupling k1 as well as the locking bolts 67 are in engagement (with the openings 69). In detail, the locking bolts 67 are slotted at their lower ends and extend with two legs 67.1 thus formed in this way, beyond the outer periphery of the gating disc 68, where they are guided by means of a gating bolt 67.2 passing through the gating disc 68 in an elongated spiral hole 68.1. This is done in such a manner that the locking bolts 67 can be either inserted within radial guide canals 67.3 into the openings 69 radially outward (as shown) if the gating disc is rotated, or they can be withdrawn again from the openings 69 upon rotation in the opposite direction. The radial guide canals 67.3 are formed inside of wall webs or connecting pieces 60.1 which connect the tightening cylinder cover 44.2 to the outer end wall 59. The gating disc 68 is pinned to a ring flange 47.5 of the dog cup 47 with a hub part 68.2, i. e. secure against rotation, and the gating disc can rotate with this dog cup, about the outer circumference of the circular collar 44.21 of the cylinder cover 44.2. The rotary drive of the dog cup is accomplished by the worm gear 48. For low-friction support and sealing, the inner periphery of the hub 68.2 and for the most part, the inner periphery of the circular flange 47.5, is lined with an abrasion-resistant material, especially sleeve 69' of teflon.

The hand wheel 29 which can be seen in FIG. 6C, has a shaft 29.1 which passes through a shaft tube 29.2 and is coupled through an angle transmission, not shown in FIG. 6, to the pinion shaft 28.1. A second hand wheel (which is not shown in FIG. 6) with a shaft and an angle transmission, is provided for operating the worm gear or coupling wheel 48' shown in FIG. 6B, in which connection reference is made to FIGS. 7 and 13 below.

In FIG. 7 the two hand wheels 29, 70 are seen with their transmission shafts 29.1, 70.1 indicated by dot-dash lines. The shafts each lead to an angle transmission G1, G2, with miter gears g11 to g13 and g21 to g23, respectively. On the output side, a shaft part 29.2 of the first angle transmission G1 is connected through a coupling piece 29.3 to the pinion shaft 28.1 in an axially movable and spring-loaded manner, but secured against mutual rotation. To this end, the pinion shaft 28.1 is supported in a cavity 29.3a of the coupling piece 29.3 in an axially movable manner and is axially spring-loaded by a compression spring 29.3b pushed over a reduced-diameter shaft part and guided axially movably but secured against rotation by at least one key 29.3c in corresponding longitudinal slots 29.3d in the inner periphery of the coupling piece 29.3. This particular kind of support for the pinion 28 and the pinion shaft 28.1 has the advantage of being able to elastically retreat when the pinion axially approaches the counter nut 27 and the pinion teeth do not yet completely coincide with the tooth gaps of the external gearing in the coupling process. The proper coupling with mutual engagement of the two gears can take place with a slight rotation of the hand wheel 29 or of an upper hand wheel 29' which likewise acts on the pinion shaft 28.1.

The hand wheel 70 and the hand wheel 70' yet to be explained, rotates the worm gear 48' also seen in FIG. 6B, through the angle transmission G2 and through a further angle transmission G5 with miter gears g51, g52 and a transmission shaft section 70.3 carrying the miter gear g52 at one end and a worm 48.1 at the other end. This apparatus serves for engaging and disengaging the bayonat coupling k1 as well as for simultaneously engaging and disengaging the locking bolts 67 shown in FIG. 6 B through the gating disc 68. The axially movable support of the piston rod 43a which is springloaded by the bayonet spring 51, also serves in this case for axially elastically deflecting the coupling dog 46 during the coupling process in case the cross-shaped slot 46.1 (see FIG. 6 B) and the cross heat 20.7 do not coincide completely. In general, this occurs rarely; the desired alignment can then be obtained by a slight rotation of the hand wheel 70 or 70'.

As seen in FIG. 7, the hand wheels 29, 70 are mounted at the tool-transmission part B12; they can therefore be called lower hand wheels. However, upper hand wheels 29', 70' are coupled into the angle transmissions G1, G2, through supplemental angle transmission G3, G4 with the miter gears g31, g32 and g41, g42, respectively, and the corresponding drive shaft parts w31, w32 and w41, w42, respectively. The upper hand wheels 29', 70' permit remotely controlled operation through the drive shafts w32 and w42 constructed as long coupling shafts, from the control platform 17 or an auxiliary bridge at the upper end of the mast B4, shown in FIG. 3. If the upper hand wheel 29' or 70' is turned, the corresponding lower hand wheel 29 or 70 idles along.

FIG. 7 shows the connecting points w33 and w43 for the vertical drive shafts w32 and w42 of FIG. 13, and furthermore, shows a connecting flange b41 at the cover wall 56 of the transmission housing B2.

Figure 11:
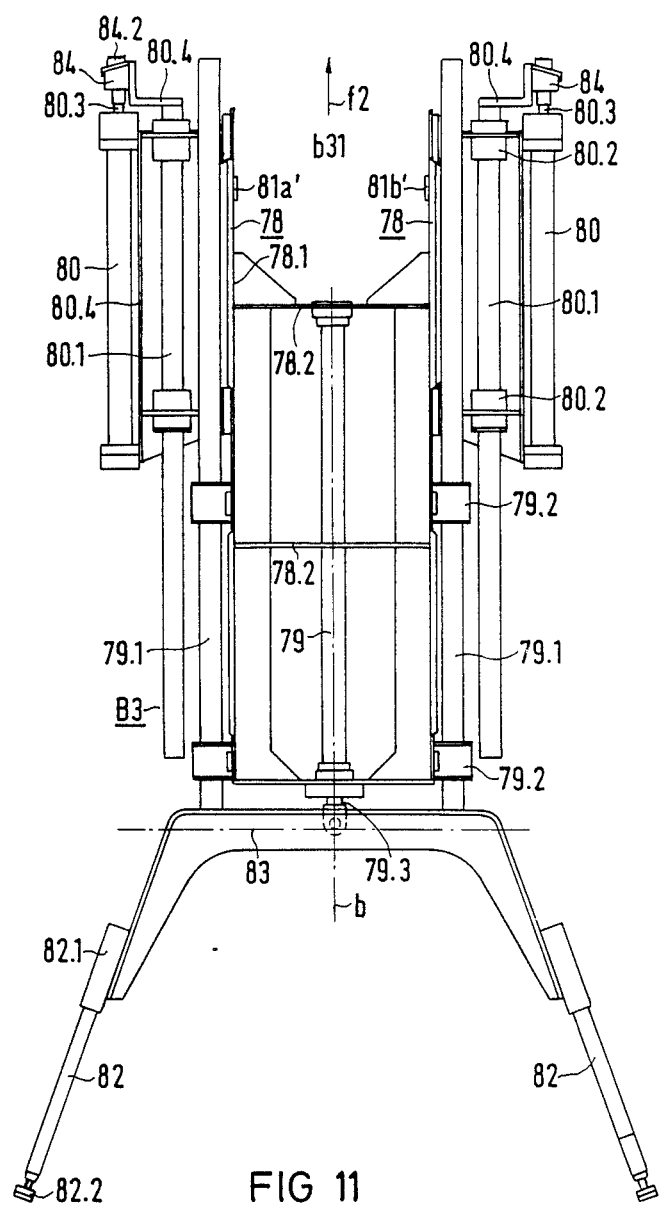
FIG. 11 is an enlarged top plan view of the subassembly of the positioning device of the operating device, shown on a smaller scale in FIG. 5.
Figure 12:
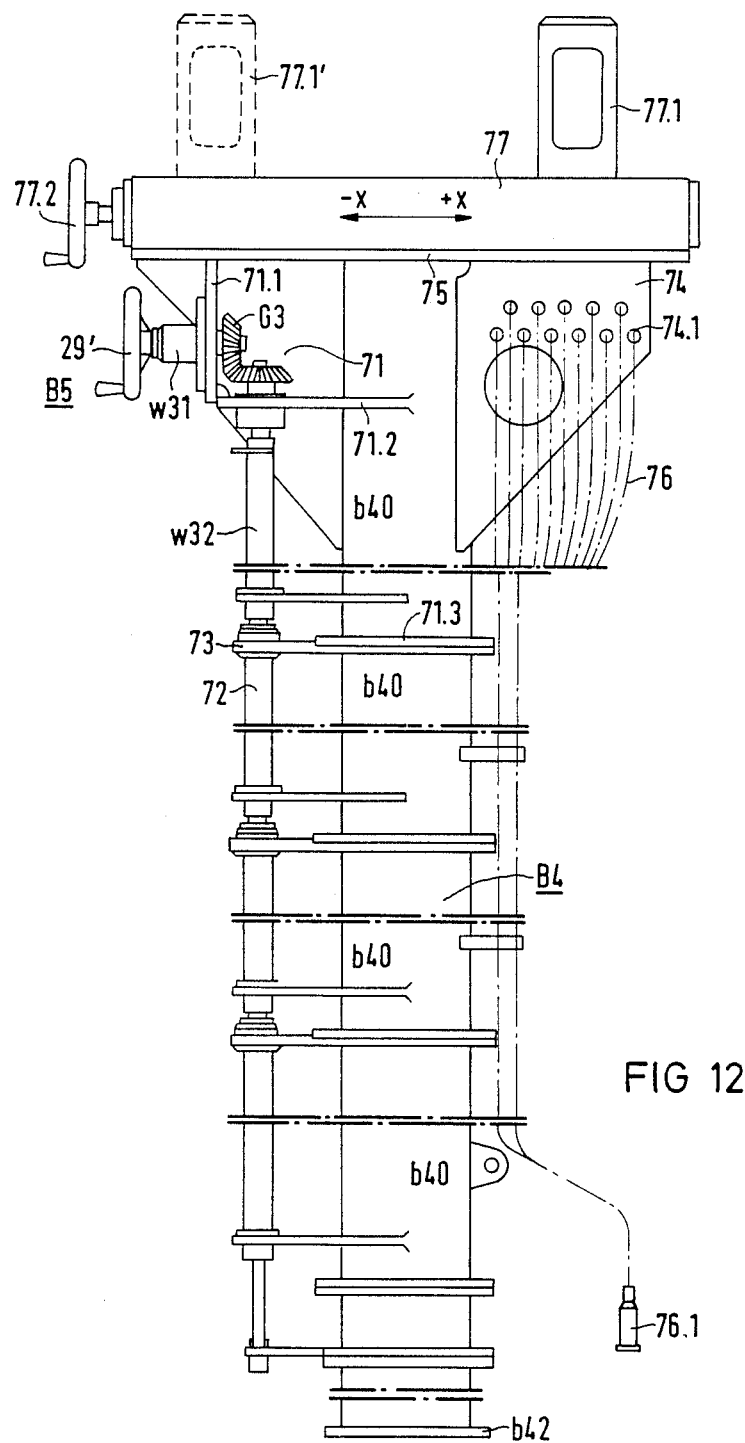
FIG. 12 is a detailed front elevational view of the support mast B4 of the operating device also seen in FIG. 3, with an upper transmission housing and a balancing carriage at the upper end thereof, as well as with coupling shafts and hydraulic lines for connection to corresponding coupling points of the transmission housing fastened to the lower end of the support mast.

FIG. 12 shows a shortened portion of the support mast B4 with a lower connecting flange b42. The support mast B4 can be advantageously assembled from individual mast sections b40 having interconnected flanges, to reach to its full length. From the left part of FIG. 12, the vertical drive shaft w32 with the angle transmission G3 and the hand wheel 29' can furthermore be seen. A transmission box 71 of approximately triangular cross section, welded to the upper end of the mast, has vertical and horizontal bearing plates 71.1, 71.2 which serve for supporting the angle drive G3 and the ends of the drive shafts w31 and w32. Furthermore, horizontally aligned bearing plates 71.3 are fastened to the mast and distributed over its length along with tube sleeves 72 and bearing bushings 73, which together support the shaft w32 along its length. The same structure applies for the disposition and support of the angle drive G4 associated with the other upper hand wheel 70 and for the drive shaft parts w41, w42, not shown in FIG. 12. In the upper right-hand part of FIG. 12, a junction box 74 is shown which is approximately trapezoidal or triangular and is connected to a horizontal top plate 75 of the support mast B4 with a flange, like the gear box 71. Pressure medium lines 76 shown in part, end at hydraulic pressure medium connections 74,1 of the upper junction box 74. The lines 76 can be connected through plugs 76.1 at their lower ends by non-illustrated pressure medium connectors of the lower transmission housing B2. These hydraulic lines are required for acting the tightening piston-cylinder system 43, 44 for the test line 30, and for actuating the piston-cylinder systems of the positioning device B3, to be explained in detail by making reference to FIGS. 11 and 5.

FIG. 12 shows, finally that the gear or transmission box 71 and the junction box 74 are structurally combined by the top plate 75 with a balancing beam 77. A suspension eye 77.1 supports the beam 77 so as to make it adjustable along coordinates $+x/-x$ which extend parallel to the longitudinal axis b of the tool-transmission part B12 connected to the lower end of the mast by a flange. The adjustment is accomplished by a hand crank 77.2 above the gear box 71. For instance, the hand crank 77.2 can move a spindle in both directions of rotation. A travelling nut is supported on the spindle, is secured against rotation although axially movable, and is connected to the suspension eye. In this manner, the support mast which is suspended with the suspension eye 77.1 from a crane hook 9 a of the building crane 9 shown in FIG. 3, can always be balanced into the vertical position. This is necessary in order to take into consideration the shift of the center of gravity which is due to the fact that the support mast B4 is suspended from the building crane together with the sealing insert A, when the sealing insert A is inserted, but the mast must first be brought to the sealing insert A without the sealing insert for removing the sealing insert A and the mast must be coupled to the insert through its tool-transmission part B12. Normally, a shift of the suspension eye along the coordinates $+x/-x$ is sufficient for balancing, because the operating or sealing device AB is practically symmetrical on both sides of the vertical plane going through the axis b. If this is not the case, it would also be possible to construct the balancing beam 77 in such a way that it permits a displacement of the suspension eye 77.1 not only in the x-direction but also in the y-direction perpendicular thereto, like a coordinate carriage.

According to FIGS. 3 to 5, the operating device B has a sealing insert positioning device B3 which serves for pushing the sealing insert into, and for pulling it out of, the nozzle opening 1a and 1d, respectively. In connection with the enlarged detailed view according to FIG. 11, it is seen that the positioning device B3 is formed of: a support frame 78 with longitudinal members 78.1 and transverse members 78.2; an insertion cylinder 79 (first piston-cylinder system) centrally fastened to the support frame 78 in the direction of the axis b; a pushing-off cylinder 80 (second and third piston-cylinder system) held on each side of the long sides of the support frame; as well as associated guide rods 80.1, 80.1 supported parallel to the axis of the piston-cylinder systems 79, 80 at the support frame 78, and guide rods 79.1, 79.1 which are guided parallel to the axis b in associated guide busings 80.2 and 79.2 fixed to the support frame. The guide bushings are firmly connected to the cylinder of the respective or associated piston-cylinder system 79 or 80.

The positioning device B3 forms a U-shaped connecting space b31 with its support frame 78, which allows the support frame 78 to be moved over the side walls 55a, 55b of the transmission housing B2 and allows the support frame 78 to be fastened at fastening points 81a, 81b which are preferably constructed as fast-action couplings, as seen in FIG. 7. The associated counter surfaces at the support frame 78 are designated with reference symbols 81a' and 81b'. FIG. 5 in connection with FIG. 11 shows that a push-in support leg pair 82, 82 pointing radially toward the inner periphery of the pressure vesel or one pointing radially toward the inner periphery of the core barrel c1, is supported at a cross piece 83 at the lower end of the support frame 78. The cross piece 83 is fastened to the end of a piston rod 79.3 of the first piston-cylinder system 79, which can be acted upon on both sides. The guide rods 79.1, which are firmly mounted to the cross piece 83, then movably guide them lengthwise in the direction b. The already mentioned second and third piston-cylinder systems 80, each of which have a push-off support leg 84 at their front ends, serve for pulling the sealing insert A out of the respective nozzle opening 1a, 1d. These push-off support legs 84 are fastened to the outer ends of the piston rods 80.3 and are connected by angle brackets 80.4 to the guide rods 80.1. The push-off cylinders 84 can also be acted upon from both sides. The associated hydraulic lines for the piston-cylinder-systems 79, 80 are not shown for the sake of simplification; it is understood, however, that corresponding hydraulic connections for coupling the hydraulic lines 76 shown in FIG. 12, are provided at the support frame 78. The feet of the push-off support leg pairs 84, 84 are set at an angle in such a manner that when pushing-off, the forces run as far as possible radially toward the inner periphery of the core barrel 1c, or (if the core barrel is removed) radially toward the inner periphery of the pressure vessel 1. The length of the push-in support legs 82, 82 is advantageously adjustable. For instance, they may be threaded spindles adjustable in threaded bushings 82.1, and are preferably equipped with teflon buffers 82.2 as support feet. This also applies to the support feet 84.2 in the push-off support leg pair 84, 84. By comparing FIG. 11 with FIG. 5 it will be seen that in the last-mentioned figure, the pair of suppor legs 82,82 is extended. Therefore, as compared to the position of the operating device B in FIG. 3, the sealing insert A located on the front side of the tool-transmission part B12 in FIG. 5 is pushed into the nozzle opening 1d. It may be assumed that the operating device B is aligned in an exactly vertical postition of its support mast B4 and rests with its push-in support legs 82, 82 against the inner periphery of the core barrel 1c (as shown in FIG. 3). In this case, if the insertion cylinder 79 is activated, the support frame guided with its guide busings 79.2 and the guide rods 79.1 in the insertion direction f2, is displaced in the direction f2, so far that the sealing insert A extends with its holding claws 15b behind the edges 35b of the corresponding core barrel opening. A the same time, the feet 84.2 of the push-off support leg pairs 84 make contact or are hydraulically caused to follow up by a small distance, so that the operating device B with its positioning device B3 is fixed in an unambiguous position and in the radial direction within the core barrel (or, if the core barrel is removed, at the walls of the pressure vessel 1). The sealing rings DR shown in FIG. 6A can then be brought into sealing contact at the inner periphery of the nozzle opening 1d (or 1a, respectively) by a shift of the cup part 20 relative to the ring part (as explained in connection with FIG. 3). The sealing insert A is pulled in the logically reversed order i. e., it is assumed that the operating device B with its tool-transmission part B12 is properly coupled to the sealing insert A concerned, and the sealing rings DR are disengaged from the inner wall of the nozzle. The push-off cylinders 80 for the push-off support legs 84 are then acted upon in such a way that the support frame 78 with the units B12 and A of the operating device B fastened thereto, is moved against the direction of the arrow f2, i. e., in the withdrawal direction, with its guide bushings 79.2 at the guide rods 79.1. If the sealing insert A has come loose in this manner, the rear pair of support legs 82, 82 can also be pulled-in by activating the insertion cylinders 79. It should be added that the push-off cylinders 80 are fastened with their guide bushings 80.2 to the brackets 80.4 and the brackets in turn are laterally fastened to the support frame 78. The brackets 80.4 are formed of mutually connected longitudinal and transverse plates which are not specifically designated.

Figure 8:
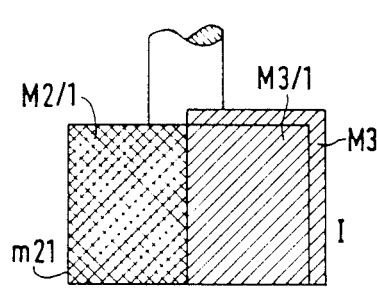
FIGS. 8 to 10 are respective detailed, fragmentary, cross-sectional view of an extension of the tightening piston rod of the tightening tool part provided with marking areas. Three different positions for visually indicating the state of the sealing insert are shown, namely, in which the sealing insert is unlocked and untightened in FIG. 8, the sealing insert is locked and untightened in FIG. 9, and the sealing insert is locked and tightened in Fig.10.
Figure 9:
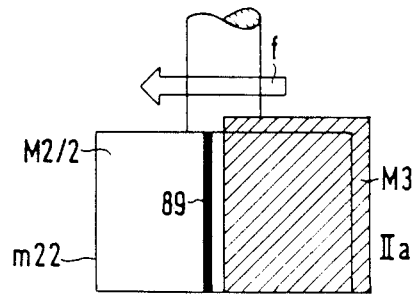
Figure 10:
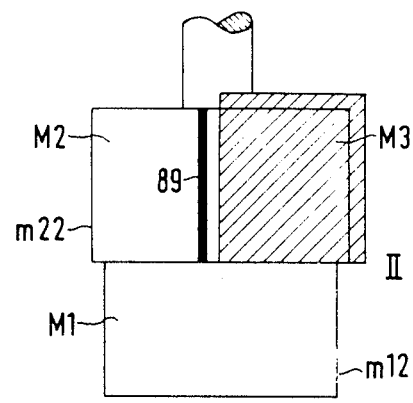

If the sealing insert A is coupled to the tool-transmission part B12, which must be done under remote control from the auxiliary bridge when the sealing insert is disassembled, it is important that the engagement of the coupling is performed with the greatest possible reliability and that in addition, an acknowledgement to the outside, i.e. to the operator, is also given. As can be seen from FIG. 6B, the locking bolts 67 can be inserted into the openings 69 in the ring part shell 25.2 by rotation of the gating disc 68 and by rotation of the worm gear 48', if at the same time the coupling claw 46 extends behind the cross head 20.7. By turning the piston rod 43a through 45°, coupling of the coupler k1 is then established as well as locking by means of the locking bolts 67. Only when the dual engagement of the elements k1 and 67/69 is accomplished, can the coupled-on turnbuckle 20.3 be axially displaced by the distance Δ12 by means of the tightening piston 43 in the direction f1, and only if this tightening distance Δ12 has been traversed, is the counter nut 27 advanced by means of the pinion 28 and the pinion shaft 28.1 so far that it makes contact with the counter end face 25.32 of the ring part 25. Then the hydraulic tightening piston 43 can be relieved again. In order to ensure that all these locking and tightening functions can be unambiguously recognized from the outside, end switches can be provided, which give acknowledgement signals to the control console E shown in FIG. 3 through electric or fluidic signal lines. This, however, requires the installation of additional lines. A visual signalling device as is shown in the right-hand part of FIG. 6C and in FIGS. 8 to 10, is simpler. For this purpose, the tightening piston rod 43a has an axial extension 43b which is provided with first marking areas M1 and extends outward from the transmission housing B2. The marking areas M1 have two axial positions m11, m12 which indicate two positions "sealing insert not tightened" or "tightened", relative to a fixed marking M3. Furthermore, another outwardly extending axial extension 47b of the extension 47.2 is provided with second marking areas M2, two rotationangle positions m21 (FIG. 8) and m22 (FIGS. 9 and 10) of which indicate two positions "sealing insert not locked" (m21) and "locked" (m22), relative to the fixed marking M3. In this manner it is recognizable through visual long-distance control from the auxiliary bridge downward through the water column 19, whether the sealing insert A is unlocked and loosened, locked and released, or locked and tightened.

The piston rod extension 43b is a tubular body which is mounted on a post 43.41 of the reduced rod section 43.4 and is pinned to the post. The extension 43b carries a cup-shaped body 85 at its outer end. The bottom 85.1 of the body 85 points outward and is fastened at the free end of the tubular extension 43b by means of a disk-shaped coupling piece 85.3 provided with a centered post. A cylinder shell 85.2 of the cup-shaped body 85 is provided at its outer periphery with the marking areas M1, which are provided in the illustrated embodiment as white cylinder surfaces. The reduced part 43.4 of the piston rod 43a, protruding to the outside, rests with a cross pin 43.5 against the cover 47.21 of the tubular extension 47.2, in the form of a stop. In the other direction, the piston rod 43a can slide with its cross pin 43.5 in elongated holes 47.5 formed in the second axial sleeve-like extension 47b up to sides 47.51 of the elongated holes. The extension 47b is connected to the disc 47.21. The axial length of the elongated holes 47.5 is equal to or somewhat greater than the distance Δ12, which corresponds to the tightening distance of the cup part 20 and the tightening piston 43. At the other, free end, the second sleeve-like extension 47b which surrounds the first extension 43b, is connected to a second, approximately cup-shaped marking carrier 86 which is provided with a shell 86.2. The outer periphery of the shell 86.2 has the second marking areas M2. The carrier 86 has a bottom 86.1 connected to the free end of the second extension 47b with a flange ring 47.6, and flange bolts 47.7. The bottom 86.1 has a central cutout 86.3, through which the first extension 43b protrudes. The fixed marking M3 is an approximately half-shell-shaped cover 87 which covers the cup-shaped bodies 86 and 85 and their associated marking areas M1, M2 toward the top, with a small gap 87.1. The cover 87 is fastened by a flange 87.2 to the end wall 56. The holes 88 in the bodies 85, 86 facilitate their movement within the water bath of the reactor pressure vessel. The marking M3 serves as a fixed pointer which makes only the dark part M2/1 of the marking areas M2 visible from above in a position I shown in FIG. 8. The dark color is indicated by a raster hatching; it may be, for instance, a darkened or black color marking. The pointer M 3 may be formed of transparent material which is indicated by the shading M3/1. In FIG. 8 the sealing insert A is unlocked and released; this corresponds to the position I in FIG. 3. According to FIG. 9, a position IIa of the sealing insert A is shown, in which, while locked, the sealing insert is still released. This position IIa corresponds to the illustration according to FIG. 6. The piston rod 43a is turned in this case about 45° for establishing the coupling, in the direction of the rotary arrow f. A white signal area M2/2 with a black line has therefore appeared below the pointer M3.

If the sealing insert A is brought into its locked and tightened position II (see FIG. 5), in which the piston rod 43a has travelled an axial distance Δ12 in the direction f1 (FIG. 6), then the first marking area M1 appears below the second marking area M2. The first marking area M1 is likewise provided in the example as a white signal area. The position m12 of the marking areas M1 corresponds to this position II of the sealing insert A while the covered up or pulled-in position of the marking areas M1 are better seen in FIG. 6C and are designated there with reference symbol m11.

FIG. 6B further shows a snap ring 90 at the end face of the housing 53, for the outer radial bearing 52 which is axially held by means of a screw connection 91 sitting on the thread 47.6 of the extension 47. Holes 53.3 in the bearing housing 53 serve as the inlet and outlet of the water to the water-lubricated bearing. Ribs 92, 93 at the outer periphery of the ring part serve for stiffening the ring part 25 and at the same time support the angle ring 25.1. In FIG. 6, the hydraulic lines and connections for the tightening cylinder 44 are not shown for the sake of simplification; the pinion 28 and the pinion shaft 28.1 are also only indicated diagrammatically.

The counter nut 27 is advantageously lubricated at its trapezoidal thread 27.2 with a water-resistant permanent lubricant.

To the extent that it is not obvious from the above, the operation of the sealing device will now be explained, making reference to FIGS. 3 to 5. Depending on whether the sealing insert is to seal an inlet nozzle 1a or an outlet nozzle 1d, a corresponding sealing insert A1 or A2 is assembled to its tool-transmission part B12 and the positioning device B3 as well as to the support mast B4. According to FIG. 3, the mast also advantageously has the gear box B5 with the junction box and the balancing beam or carriage B6. The positioning device B3 is also fastened to the support mast B4, by means of diagonal struts b32, in addition to the fastening at the tool-transmission part B12, so that exact position is fixed thereby. The sealing insert A which is connected to its operating device B including the support mast B4, can now be inserted into a nozzle mock-up or dummy C which serves as a test station and is mounted at the level of the control platform 17 or at the upper edge of the reactor chamber, until its holding claws 15 (see FIG. 4) extend behind the rim of the nozzle mock-up C in the manner shown for the real insertion in FIGS. 4 and 5. By operating the lower hand wheels 29, 70 seen in FIG. 13 which are, of course, immediately accessible at the tool-transmission part B12, the tightening tool B1 is locked and tightened and the sealing rings DP therefore are brought into tight contact at the inner periphery of the nozzle mock-up C. By retightening the counter nut 27 shown in FIG. 6A, the sealing position of the turnbuckle 20.3 is then fixed and by admitting pressure to the pressure test line 30, the tightness of the sealing ring seats 21, 22 can now be tested. After the test of the sealing insert A has been completed, the insert can be removed from the nozzle mockup C and, if the test was satisfactory, can be lowered into the reactor pressure vessel 1 for sealing one of its nozzles 1a, 1d. The further operations then follow, as already explained in connection with the figures. When all sealing inserts A, which may also be called sealing plugs, are set, the interior of the reactor pressure vessel 1 and the reactor chamber 8 with its water column 19 are compartmentalized or separated from the rest of the primary loop. These remaining parts of the primary loop, such as the primary chamber 3a of the steam generator or the primary loop piping 4 and the primary chamber of the reactor coolant pump 2, can now be drained if necessary so that inspection work can be performed. After the inspection is completed, water can be admitted to the primary chambers and the sealing inserts A can be pulled one after the other by the operating device B, i.e., disassembled and transported away. For the disassembly, the operating device B with its support mast B4, naturally without a sealing insert, is lowered and suspended from the crane hook 9a; it therefore would basically have a different position of the center of gravity, for which reason the operating device B is rebalanced by means of the balancing beam B6, as already explained, so that it hangs down with the support mast B4 in an exactly vertical position. The operating or sealing equipment AB is then controlled, as already explained in the description of the positioning device B3, in such a way that it is coupled with its tool-transmission part B12 to the respective sealing insert A. After pressure equalization through the flooding valve 36, explained in connection with FIG. 14, the sealing insert A can then be transferred into the released state, which is accomplished by shifting the cup part 20 with the tightening piston 43 at its turnbuckle 20.3. The shift is effected over a small distance in the direction f1 (FIG. 6) so that the counter nut 27 comes free and can be turned loose by operating the upper hand wheel 20'. By admitting pressure to the other side of the piston 43, the cup part 20 with its turnbuckle 20.3 can then be pushed into the released position according to FIG. 6, in which the sealing rings DR come loose from the inner periphery 1i of the nozzle opening 1a or 1d, respectively. The sealing insert A can be pulled out of the nozzle opening by suitable actuation of the push-off cylinders 80 of the positioning device B3, and in the pulled-out condition (see FIG. 3, for instance), the two pairs of support legs 84, 84 and 82, 82 can be pulled-in by operating the push-off and insertion cylinders 80 and 79, respectively, The respective sealing insert A can then be hoisted at the operating device B by the building crane 9, to a deposition location.

The foregoing is a description corresponding in substance to German Application No. P 32 28 802.6, dated Aug. 2, 1982, the International priority of which is being claimed for the instant application, and which is hereby made part of this application. Any material discrepancies between the foregoing specification and the aforementioned corresponding German application are to be resolved in favor of the latter.

We claim:

1. A disassembleable and reassembleable sealing device for pipelines, comprising a cylindrical sealing insert being insertable into a pipeline in a given direction, said sealing insert having a front cup part with a closed cross section and a rear ring part, as seen in said given insertion direction, said cup and ring parts being annular, coaxial and slideable into each other in axial direction of said sealing insert, said cup and ring parts having corresponding peripheral surfaces and ring shoulder surfaces at the outer periphery of said cup and ring parts defining at least one ring seat, a series of solid sealing rings inserted into said at least one ring seat between said cup and ring parts, means for sliding said cup and ring parts toward each other mechanically bulging said sealing rings outward by deformation forces exerted on said sealing rings by said at least one ring seat, increasing the diameter of said sealing rings by pressing said sealing rings against said at least one ring seat and forming a ring bead on said sealing rings resting against the inner periphery of the pipeline forming a seal, and an operating device being coupleable to and uncoupleable from said sealing insert for transporting, inserting and disassembling said sealing insert and for actuating said sliding means, said cup part being in the form of a tightening element moveable in both axial directions relative to said ring part for tightening said sealing ring, said cup part including a turnbuckle extending through said cup and ring parts and having a thread, a lock nut disposed on said thread of said turnbuckle for locking said cup part relative to said ring part in a tightened position, means for turning said lock nut by remote control, said operating device including a tightening tool with a tightening cylinder associated with said ring part and a tightening piston disposed in said tightening cylinder and associated with said turnbuckle, and means for feeding pressure medium to said tightening cylinder causing said tightening piston to move said turnbuckle and tighten and loosen said cup part relative to said ring part by remote control.

2. A sealing device according to claim 1, wherein said sealing rings has a substantially bone-shaped cross section with enlarged lobetype ends and an inner central constriction.

3. A sealing device according to claim 2, wherein said constriction is formed on the inner periphery of said sealing rings and has a flattened V-shape.

4. A sealing device according to claim 3, wherein said sealing rings, as seen in cross section, has an outer periphery with a substantially symmetrical trapezoidal shape having a flattened surface for contacting the inner periphery of the pipeline, and lobe surfaces extended at an angle inward from the contact surface toward the ends of said sealing ring.

5. A sealing device according to claim 4, wherein said ring shoulder surfaces of said ring seat are substantially concave V-shaped and opposite each other, and said sealing rings has end faces being substantially convex V-shaped and inserted between said ring shoulder surfaces.

6. A sealing device according to claim 5, wherein said sealing rings has a thickness in vicinity of said constriction being substantially one-fifth smaller than the thickness at the thickest point of the ends thereof, and an axial length substantially two to five times as large as the largest radial length thereof.

7. A sealing device according to claim 1, wherein said ring shoulder surfaces are in the form of one surface formed on said cup part and another surface formed on said ring part, and said at least one sealing ring is in the form of first and second sealing rings axially spaced apart from each other on the outer periphery of said cup part, and including a spacer ring slideably disposed on the outer periphery of said cup part between said sealing rings, said spacer ring having ends with shoulder surfaces formed thereon defining spacer ring seats, the inner end of each of said sealing rings being disposed against a respective one of said spacer ring seats, and the outer end of each of said sealing rings being disposed against a respective one of said ring shoulder surfaces.

8. A sealing device according to claim 1, wherein said ring part is an abutment being lockable in both axial directions, and said cup part is a tightening element being movable relative to said ring part in both axial directions by tightening forces, and including means for exerting said tightening forces for locking said cup part in a tightened position and for subsequently releasing said tightening forces for unlocking said cup part for disassembly while briefly resinstituting said tightening forces.

9. A sealing device according to claim 8, wherein said ring part includes a guide sleeve being coaxial with said ring part and having an end face, and a cylindrical shell connected to said guide sleeve, and said cup part includes a bottom, and including a turnbuckle rigidly and centrally connected to said bottom of said cup part and extended through said cup part and through said guide sleeve, said turnbuckle having a coupling end and an external thread, said force exerting means including a tightening tool coupleable to said coupling end, and a remotely controlled counter nut supported on said external thread axially behind said guide sleeve as seen in tightening direction of said nut, said nut being retightenable for locking said cup part in said tightened position and having an end face facing said end face of said guide sleeve.

10. A sealing device according to claim 7, wherein said sliding means include means for adjusting said deformation forces which cause said ring bead to contact the inner periphery of the pipeline to be larger for said first sealing ring than for said second sealing ring, causing said second sealing ring to make contact before said first sealing ring and causing said first sealing ring to make contact only when said cup part is moved axially in a tightening direction.

11. A sealing device according to claim 10, wherein said second sealing ring has grooves formed in the outer periphery thereof, and said first sealing ring has a solid cross section.

12. A sealing device according to claim 1, wherein said cup part has a bottom in the form of a ribbed partition wall.

13. A sealing device according to claim 9, wherein said cup bottom is in the form of a ribbed partition wall including a hub disposed in the center thereof for tightly receiving and fastening said turnbuckle.

14. A sealing device according to claim 12, wherein said partition wall includes protruding portions forming said ring shoulder surfaces of said cup part for said sealing ring.

15. A sealing device according to claim 7, wherein said cup part includes an outer shell, and said spacer ring includes a peripheral web disposed between said spacer ring seats having a hole formed therein, said web having an interior space bounded, in tightened position of said spacer ring, by the inner periphery of said spacer ring and the outer periphery of said cup part, and including a pressure line for tightness testing in communication with said interior space through a hole formed in said outer shell of said cup part, for testing pressure in another space bounded by said sealing rings, the inner periphery of the pipeline and the outer periphery of said cup part.

16. device according to claim 1, wherein said ring part includes a shell and an angle ring, said angle ring having a radial leg fastened to said shell and an axial leg with a free end containing said ring shoulder surface contacting an end of said sealing ring disposed on the outer periphery of said ring part.

17. A sealing device according to claim 1, including means for securing said cup part and ring part against rotation relative to each other about the longitudinal axis thereof.

18. A sealing device according to claim 17, wherein said ring part includes a shell and said cup part includes a cylindrical shell having radially inwardly projecting posts disposed on the inner periphery thereof engaging in elongated holes formed in said shell of said ring part.

19. A sealing device according to claim 15, wherein said pressure line is a hydraulic line.

20. A sealing device according to claim 15, wherein said cup part and ring part have a transition region disposed therebetween, and said pressure line is extended through said ring part and disposed in spirals in said transition region for compensating the tightening distance between said cup part and ring part, and including a mouth piece disposed on said pressure line at the inner periphery of said cup part leading to said other space.

21. A sealing device according to claim 20, wherein said ring part includes a guide sleeve being coaxial with said ring part and having an end face, and a cylindrical shell connected to said guide sleeve, and said cup part includes a bottom, and including a turnbuckle rigidly and centrally connected to said bottom of said cup part and extended through said cup part and through said guide sleeve, said turnbuckle having a coupling end and an external thread, said force exerting means including a tightening tool coupleable to said coupling end, and a remotely controlled counter nut supported on said external thread axially behind said guide sleeve as seen in tightening direction of said nut, said nut being retightenable for locking said cup part in said tightened position and having an end face facing said end face of said guide sleeve, and said spirals being disposed around said turnbuckle.

22. A sealing device according to claim 1, including support roller arms protruding in said given insertion direction from vicinity of the periphery of said cup part, for guiding said sealing insert into the pipeline.

23. A sealing device according to claim 22, wherein said cup part includes a shell and a bottom in the form of a partition wall, said partition wall having a front and extending axially beyond said shell in said given insertion direction, and said support roller arms being fastened on said front end.

24. A sealing device according to claim 23, wherein said support roller arms are fastened symmetrically to the vertical in substantially the lower third of said front end of said cup part.

25. A sealing device according to claim 1, wherein said ring part includes holding claws disposed at the outer periphery thereof, said claws being clamped to the mouth of the pipeline and adapted to the contour of the mouth of the pipeline and including means for locking said claws against further insertion.

26. A sealing device according to claim 25, wherein said claws are in the form of separate claws having a shape adapted to inlet and outlet nozzles of reactor coolant lines of a reactor pressure vessel.

27. A sealing device according to claim 25, wherein said ring part includes a shell having an outer periphery and a circular flange, and said holding claws have a doubly bent cross section formed of an axially extended claw connecting piece resting against the outer periphery of the shell but inside the inner contour of the pipeline, first claw ends disposed on said connecting piece and clamped behind said circular flange, and second claw ends disposed on said connecting piece and clamped behind end faces of the pipeline, when said sealing insert is inserted.

28. A sealing device according to claim 25, wherein said claws are in the form of at least four holding claws uniformly distributed over the circumference of said ring part.

29. A sealing device according to claim 1, including a reactor pressure vessel having a water column standing therein, and wherein said cup part includes a bottom and a remotely controlled flooding valve disposed in said bottom, said valve having a valve seat and a spring-loaded closing piece pressing against said valve seat by the water column standing in the reactor pressure vessel, said valve being briefly openable for pressure equalization prior to disassembly of said sealing insert.

30. A sealing device according to claim 29, including a valve plunger connected to said valve closing piece, a rocking lever supported at a fulcrum on said bottom and having two lever arms, one of said lever arms being movable into engagement with said valve plunger, and an actuating rod supported at the inner periphery of said ring part and being engageable with the other of said lever arms.

31. A sealing device according to claim 1, including a core barrel of a nuclear reactor pressure vessel having an inner periphery, and wherein said ring part includes a guide sleeve and said cup part includes a bottom, a turnbuckle being connected to said bottom and extended through said cup part and said guide sleeve and having an external thread, and a counter nut having an internal thread meshing with said external thread of said turnbuckle for locking against said guide sleeve, said counter nut also having external gearing; said operating device includes a tool transmission part having a tightening tool part and a transmission housing, a tightening cylinder, means for locking said tightening cylinder to said ring part, a tightening piston having a piston rod, means for locking said piston rod to said turnbuckle, and a remotely controlled pinion shaft having a pinion meshing with said external gearing of said counter nut when said operating device is coupled; and said operating device includes a support mast having a lower end, means for connecting said lower end to said tool transmission part, a positioning device combined with said tool transmission part for pushing said sealing insert into a nozzle opening of a pipeline and for pulling said sealing insert out of the nozzle opening, a support frame for aligning said positioning device, said support frame having support legs being extendable and retractable in axial direction of the nozzle opening at the inner periphery of the core barrel of the reactor pressure vessel, and means for clamping said support legs between diametrically opposite peripheral regions.

32. A sealing device according to claim 31, wherein said ring part includes a shell, said tool transmission part of said operating device includes an insertion end coaxially insertible into said ring part, and including a bayonet coupling detachably coupling said insertion end with said piston rod to said turnbuckle, a gating disc connected to and secured against mutual rotation relative to said piston rod, and radially displaceable locking bolts disposed on the outer periphery of said insertion end, said bolts being movable by said gating disc into engagement with locking openings formed in said shell of said ring part when said piston rod is turned in a locking direction of said bayonet coupling and said bolts being movable out of engagement with said locking openings along with said bayonet coupling when said piston rod is turned in a direction opposite the locking direction.

33. A sealing device according to claim 32, wherein said transmission housing of said tool transmission part is substantially box-shaped and is adjacent said tightening tool part, said transmission housing including a locking shaft with transmissions for rotating said piston rod, said pinion shaft for rotating said counter nut, and pressure medium connections for said tightening tool part and for a pressure line for testing tightness of said sealing insert.

34. A sealing insert according to claim 33, wherein said turnbuckle has a coupling end, said tightening cylinder includes a ring collar, a bottom and a cover, said tightening piston is hollow and is extended through said bottom and said cover of said cylinder in a sealed, axially movable and rotatable manner and said piston includes a clutch dog extended around said coupling end of said turnbuckle, and including a dog cup surrounding said clutch dog with axial clearance and having a bottom, a coupling wheel connected to said bottom, said piston rod being extended through said coupling wheel so as to be axially movable but secured against relative rotation, said coupling wheel being rotatably supported by said piston rod in said transmission housing and being movable by said locking shaft, and a bayonet spring axially spring-loaded said piston rod, said gating disc being centered and rotatably supported on said ring collar of said cylinder and being connected to said dog cup.

35. A sealing device according to claim 33, wherein said locking shaft and pinion shaft are supported in said transmission housing, and including two angle drives each being connected to a respective one of said locking and pinion shafts, two lower hand wheels each being connected to a respective one of said angle drives, to corotating drive shafts each being connected to a respective one of said angle drives at separate coupling points, and two upper hand wheels each being connected to a respective one of said co-rotating drive shafts at an upper end of said support mast for remote control.

36. A sealing device according to claim 34, including a fixed marking outside of said transmission housing, an axial extension of said piston rod protruding out of said transmission housing and having first markings thereon movable between two axial positions relative to said fixed marking indicating tightened and untightened positions of said sealing insert, and an extension of said bottom of said dog cup protruding out of said transmission housing and having second markings thereon rotatable between angular positions relative to said fixed marking indicating locked and unlocked positions of said sealing insert, whereby remote inspection can determine the following positions of said sealing insert:
 unlocked and untightened,
 locked and untightened, and
 locked and tightened.

37. device according to claim 32, wherein said bayonet coupling between said turnbuckle and said piston rod is a hammer head bayonet lock.

38. A sealing device according to claim 32, wherein said bayonet coupling between said turnbuckle and said piston rod is a cross head bayonet lock.

39. A sealing device according to claim 34, wherein said transmission housing of said operating device includes side plates, and including means for fastening said support frame of said positioning device to said side plates.

40. A sealing device according to claim 34, wherein said support frame includes a piston-cylinder system being centrally fastened to said support frame, being actuatable from two sides and having a piston rod, a cross piece connected to an end of said piston rod of said piston-cylinder system, said support legs being a pair of push-in legs supported on said cross piece, guide bushings attached to said support frame and oriented parallel to said piston rod of said piston-cylinder system, and guide rods connected to said cross piece and guided in said guide bushings.

41. A sealing device according to claim 40, including two sets of push-off cylinders with pistons and piston rods each set being disposed on a respective side of said support frame, two guide bushings each being disposed on a respective side of said support frame, two guide rods each being guided in a respective one of said guide bushings, two brackets each being connected to a respective piston rod and a respective guide rod, and two push-off support legs each being connected to a respective one of said brackets and protruding from an end of said support frame opposite said push-in legs for pulling out said sealing insert.

42. A sealing device according to claim 35, including another transmission housing disposed at an upper section of said support mast being accessible from a control platform, said co-rotating drive shafts being parallel to said support mast and having upper ends supported by said other transmission housing, said angle drives for said upper handwheels being disposed in said other transmission housing.

43. A sealing device according to claim 42, including pressure medium lines, first pressure medium connections connecting said pressure medium lines to said first-mentioned transmission housing and to said positioning device, an upper junction box in vicinity of said other transmission housing, and second pressure medium connections connecting said pressure medium lines to said upper junction box.

44. A sealing device according to claim 42, including a balancing beam structurally combined with said other transmission housing for balancing said support mast and said operating device when said sealing insert is attached as well as when said sealing insert is detached from said support mast, and a suspension eye disposed on said balancing beam for supporting said balancing beam on a building crane hook and adjusting said balancing beam at least along coordinates parallel to the longitudinal axis of said tool transmission part.

45. A sealing device according to claim 31, wherein the outer periphery of said tightening tool part of said operating device has guide rollers disposed thereon for guiding said operating device on the inner periphery of said ring part in said given insertion direction and in a pulling-out direction opposite thereto, and said tightening tool part includes support roller arms at the front thereof protruding in said given insertion direction as insertion guides.

46. A method for preparing a sealing device for a pipeline leading to a nuclear reactor pressure vessel, which comprises inserting a cylindrical sealing insert with a cup part and a ring part into the pipeline with an operating device, the cup part being in the form of a tightening element axially movable relative to the ring part, the cup part having a turnbuckle extended through the cup part and the ring parts, the operating device including a tightening tool with a tightening cylinder associated with the ring part having a tightening piston disposed therein associated with the turnbuckle, the cup and ring parts having corresponding peripheral surfaces and ring shoulder surfaces at the outer periphery of the cup and ring parts defining at least one ring seat, inserting a series of solid sealing rings into the at least one ring seat between the cup and ring parts, mechanically bulging the sealing rings outward by deformation forces exerted on the sealing rings by the at least one ring seat by sliding the cup and ring parts toward each other, increasing the diameter of the sealing rings, pressing the sealing rings against the ring seat and forming a ring bead on the sealing rings resting against the inner periphery of the pipeline forming a seal, extending a support mast between the sealing insert and a nozzle mock-up in the form of a testing station having a rim, locking the cup part in position relative to the ring part and unlocking the cup part relative to the ring part by remote control by feeding pressure medium to the tightening cylinder of the tightening tool, screwing a counter nut on the turnbuckle by remote control for tightening the turnbuckle to the ring part, connecting the sealing insert to the operating device and to the support mast, running the sealing insert into the nozzle mock-up, engaging holding claws for clamping the sealing insert to the pipeline behind the rim of the nozzle mock-up, bringing the sealing rings into sealing contact with the inner periphery of the nozzle mock-up with the tightening tool, fixing a sealing position of the turnbuckle by readjusting the counter nut by remote control, checking the tightness of the at least one ring seat by admitting pressure through a test pressure line discharging in the vicinity of the sealing ring, removing the sealing insert from the nozzle mock-up after the test is completed, and lowering the sealing insert into the reactor pressure vessel for sealing a nozzle of the pressure vessel if the test is satisfactory.

* * * * *